(12) United States Patent
Lee et al.

(10) Patent No.: US 11,893,215 B2
(45) Date of Patent: Feb. 6, 2024

(54) ELECTRONIC DEVICE INCLUDING FLEXIBLE DISPLAY AND OPERATION METHOD THEREOF

(71) Applicant: SAMSUNG ELECTRONICS CO., LTD., Suwon-si (KR)

(72) Inventors: Jookwan Lee, Suwon-si (KR); Yongjin Kwon, Suwon-si (KR); Myunghoon Kwak, Suwon-si (KR); Changryong Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/868,388

(22) Filed: Jul. 19, 2022

(65) Prior Publication Data

US 2023/0027714 A1 Jan. 26, 2023

Related U.S. Application Data

(63) Continuation of application No. PCT/KR2022/008193, filed on Jun. 10, 2022.

(30) Foreign Application Priority Data

Jul. 21, 2021 (KR) .......... 10-2021-0095447

(51) Int. Cl.
*G06F 3/0484* (2022.01)
*G06F 3/0488* (2022.01)
(Continued)

(52) U.S. Cl.
CPC .......... *G06F 3/0484* (2013.01); *G06F 1/1624* (2013.01); *G06F 1/1652* (2013.01);
(Continued)

(58) Field of Classification Search
CPC ...... G06F 3/0484; G06F 3/041; G06F 3/0488; G06F 2203/04102; G06F 2203/04806; G06F 1/1652
See application file for complete search history.

(56) References Cited

U.S. PATENT DOCUMENTS

| 9,245,477 B2 | 1/2016 | Kwack et al. |
| 10,963,016 B1 * | 3/2021 | Oh .................. G06F 1/1626 |

(Continued)

FOREIGN PATENT DOCUMENTS

| CN | 211554913 U | 9/2020 |
| KR | 10-2014-0133034 A | 11/2014 |

(Continued)

OTHER PUBLICATIONS

International Search Report dated Sep. 14, 2022 issued in International Application No. PCT/KR2022/008193 with English translation (8 pages).

*Primary Examiner* — James T Tsai
(74) *Attorney, Agent, or Firm* — NIXON & VANDERHYE P.C.

(57) ABSTRACT

According to various embodiments, an electronic device may include: a flexible display having a first portion disposed to be visible from an outside and a second portion extending from the first portion and accommodated in an inner space to be invisible from the outside in a slide-in state; a housing whose having a variable size wherein the flexible display is configured to be expanded in response to a change from the slide-in state to a slide-out state; a sensor disposed in the inner space and configured to detect a moving distance of the flexible display; a memory; and a processor operatively connected to the flexible display, the sensor, and the memory. The processor may be configured to: identify a first distance for the flexible display through the sensor in response to the change from the slide-in state (Continued)

to the slide-out state, control the display to display a user interface through the flexible display based on the first distance, detect a touch on at least a partial region of the flexible display, identify a second distance for the flexible display based on coordinate information corresponding to the detected touch, adjust a size or position of the user interface based on a difference value between the first distance and the second distance, and control the display to display the adjusted user interface through the flexible display.

21 Claims, 24 Drawing Sheets

(51) Int. Cl.
*G06F 3/041* (2006.01)
*G06F 1/16* (2006.01)

(52) U.S. Cl.
CPC ............ *G06F 3/041* (2013.01); *G06F 3/0488* (2013.01); *G06F 2203/04102* (2013.01); *G06F 2203/04806* (2013.01)

(56) References Cited

U.S. PATENT DOCUMENTS

| | | |
|---|---|---|
| 2011/0278606 A1 | 11/2011 | Suzuki et al. |
| 2014/0204037 A1 | 7/2014 | Kim |
| 2014/0218375 A1 | 8/2014 | Kim |
| 2014/0333545 A1 | 11/2014 | Lee et al. |
| 2015/0293620 A1 | 10/2015 | Cho |
| 2017/0140504 A1* | 5/2017 | Jeong .................... G06F 1/1677 |
| 2018/0275770 A1* | 9/2018 | Kang ....................... G09G 3/20 |
| 2019/0261519 A1 | 8/2019 | Park et al. |
| 2019/0305237 A1* | 10/2019 | Shin ....................... H10K 59/12 |
| 2020/0120814 A1* | 4/2020 | Huang ................ H04M 1/0268 |
| 2020/0225848 A1* | 7/2020 | Yoon .................... G06F 1/1626 |
| 2020/0326839 A1* | 10/2020 | Walkin ................. G06F 3/0486 |
| 2021/0206266 A1 | 7/2021 | Shim et al. |
| 2023/0109078 A1 | 4/2023 | Li et al. |

FOREIGN PATENT DOCUMENTS

| | | |
|---|---|---|
| KR | 10-2015-0118753 A | 10/2015 |
| KR | 10-1670107 | 11/2016 |
| KR | 10-2014-0100149 A | 8/2018 |
| KR | 10-2047690 B1 | 11/2019 |

* cited by examiner

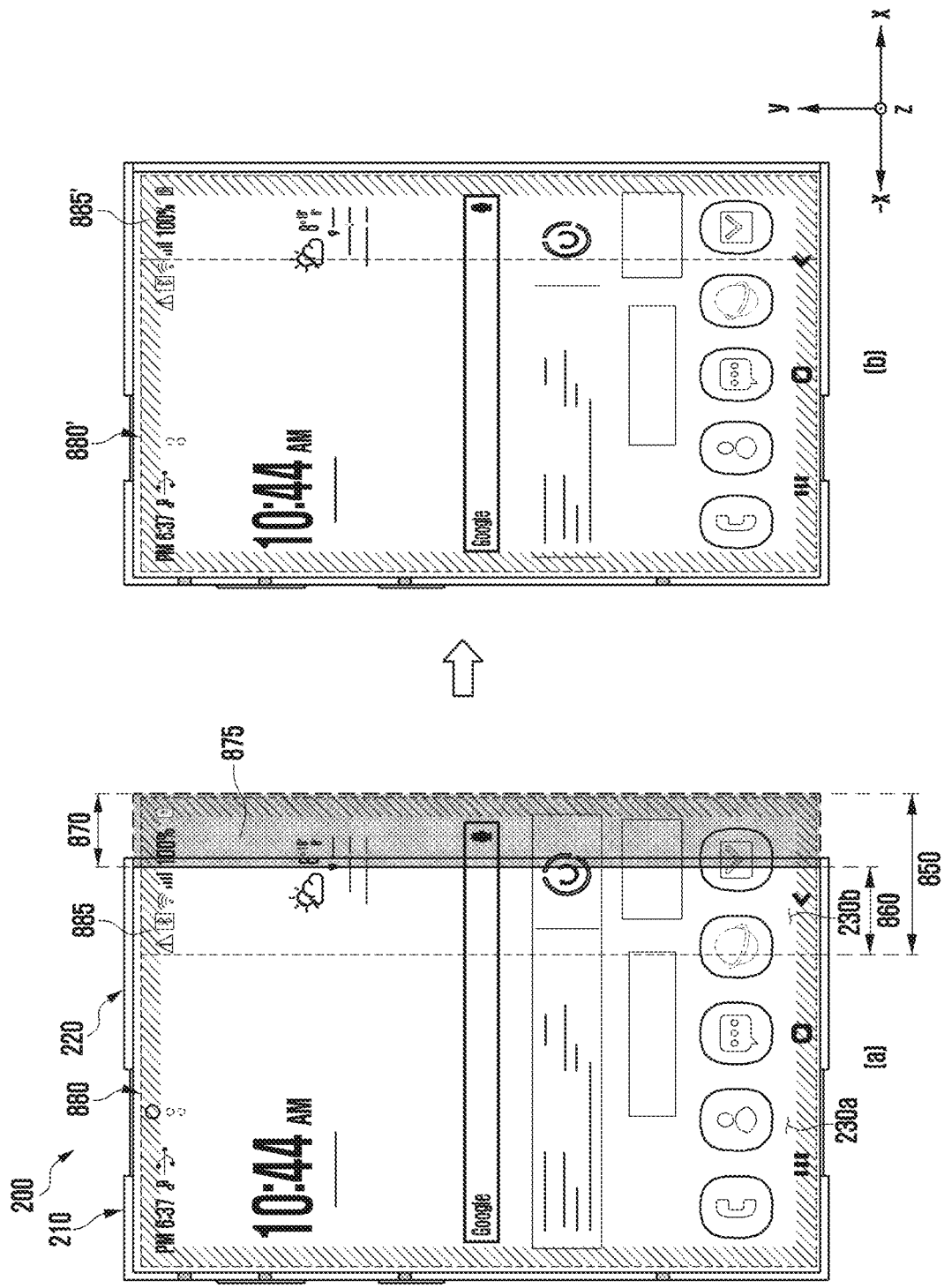

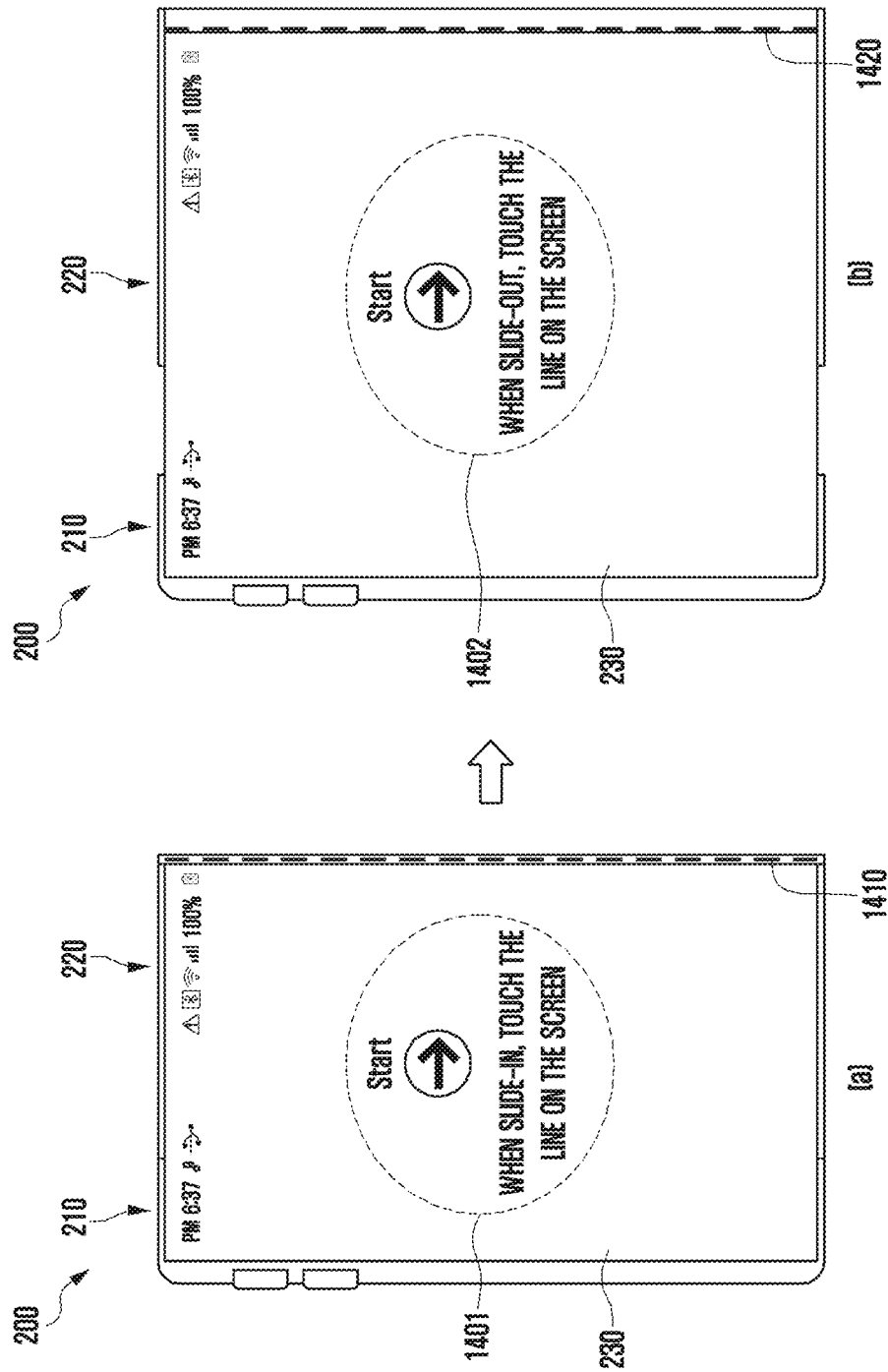

ELECTRONIC DEVICE INCLUDING FLEXIBLE DISPLAY AND OPERATION METHOD THEREOF

CROSS-REFERENCE TO RELATED APPLICATIONS

This application is a continuation of International Application No. PCT/KR2022/008193 designating the United States, filed on Jun. 10, 2022, in the Korean Intellectual Property Receiving Office and claiming priority to Korean Patent Application No. 10-2021-0095447, filed on Jul. 21, 2021, in the Korean Intellectual Property Office, the disclosures of which are incorporated by reference herein in their entireties.

BACKGROUND

Field

The disclosure relates to an electronic device including a flexible display and an operation method thereof.

Description of Related Art

In an electronic device including a flexible display, the flexible display may have a variable size of a screen exposed/visible to the outside. For example, the electronic device may include a slidable electronic device and/or a rollable electronic device. The electronic device may measure, using at least one sensor, a moving distance (or position) of an electronic device housing resulting from a sliding or rolling motion and, based on the measured moving distance (or position), display an enlarged or reduced screen.

In the electronic device, a sliding distance measured using a sensor may be different from a physically moved sliding distance. For example, a magnetic force sensor may be affected by at least one of the occurrence of errors due to temporary or permanent characteristic change of external or internal magnetic force, the effect of non-linear performance due to the temperature of analog-digital converter (ADC), a change in measured values due to motor wear, a change in clearance between the magnetic force sensor and a sensing object (e.g., a sensing target) due to an external impact, and/or deterioration in performance of the sensor. When the sliding distance measured by the sensor is different from the actual sliding distance, at least one of a screen display size, position, and/or layout may be incorrect.

SUMMARY

Embodiments of the disclosure provide an electronic device that provides a user interface (UI) substantially corresponding to a screen size resulting from an actual moving distance, based at least in part on touch information on a flexible display, when a moving distance of an electronic device housing measured using a sensor is different from the actual moving distance.

According to various example embodiments, an electronic device may include: a flexible display having a first portion disposed to be visible from an outside and a second portion extending from the first portion and accommodated in an inner space to be invisible from the outside in a slide-in state; a housing having a variable size and configured to expand in response to a change from the slide-in state to a slide-out state; a sensor disposed in the inner space and configured to detect a moving distance of the flexible display; a memory; and a processor operatively connected to the flexible display, the sensor, and the memory. The processor may be configured to: identify a first distance for the flexible display through the sensor in response to the change from the slide-in state to the slide-out state, control the display to display a user interface through the flexible display based on the first distance, detect a touch on at least a partial region of the flexible display, identify a second distance for the flexible display based on coordinate information corresponding to the detected touch, adjust a size or position of the user interface based on a difference value between the first distance and the second distance, and control the display to display the adjusted user interface.

According to various example embodiments, a method may include: identifying a first distance for a flexible display through a sensor in response to a change from a slide-in state to a slide-out state, detecting a touch event for at least a partial region of the flexible display, identifying a second distance for the flexible display based on coordinate information corresponding to the detected touch event, adjusting a size of a user interface based on a difference value between the first distance and the second distance, and displaying the adjusted user interface through the flexible display.

According to various example embodiments of the disclosure, it is possible to provide an electronic device that displays a UI substantially corresponding to a screen size resulting from an actual moving distance, based at least in part on touch information on a flexible display, when a moving distance of an electronic device housing measured using a sensor is different from the actual moving distance. In addition, various effects explicitly or implicitly appreciated through the disclosure may be provided.

BRIEF DESCRIPTION OF THE DRAWINGS

In connection with the description of the drawings, the same or similar reference numerals may be used for the same or similar components. In addition, the above and other aspects, features and advantages of certain embodiments of the present disclosure will be more apparent from the following detailed description, taken in conjunction with the accompanying drawings, in which:

FIG. 9A is a diagram illustrating a second example in which a flexible display is changed in size according to various embodiments;

FIG. 14A is a diagram illustrating an example user interface providing a guide in a slide-in state and a slide-out state according to various embodiments;

DETAILED DESCRIPTION

Figure 1:
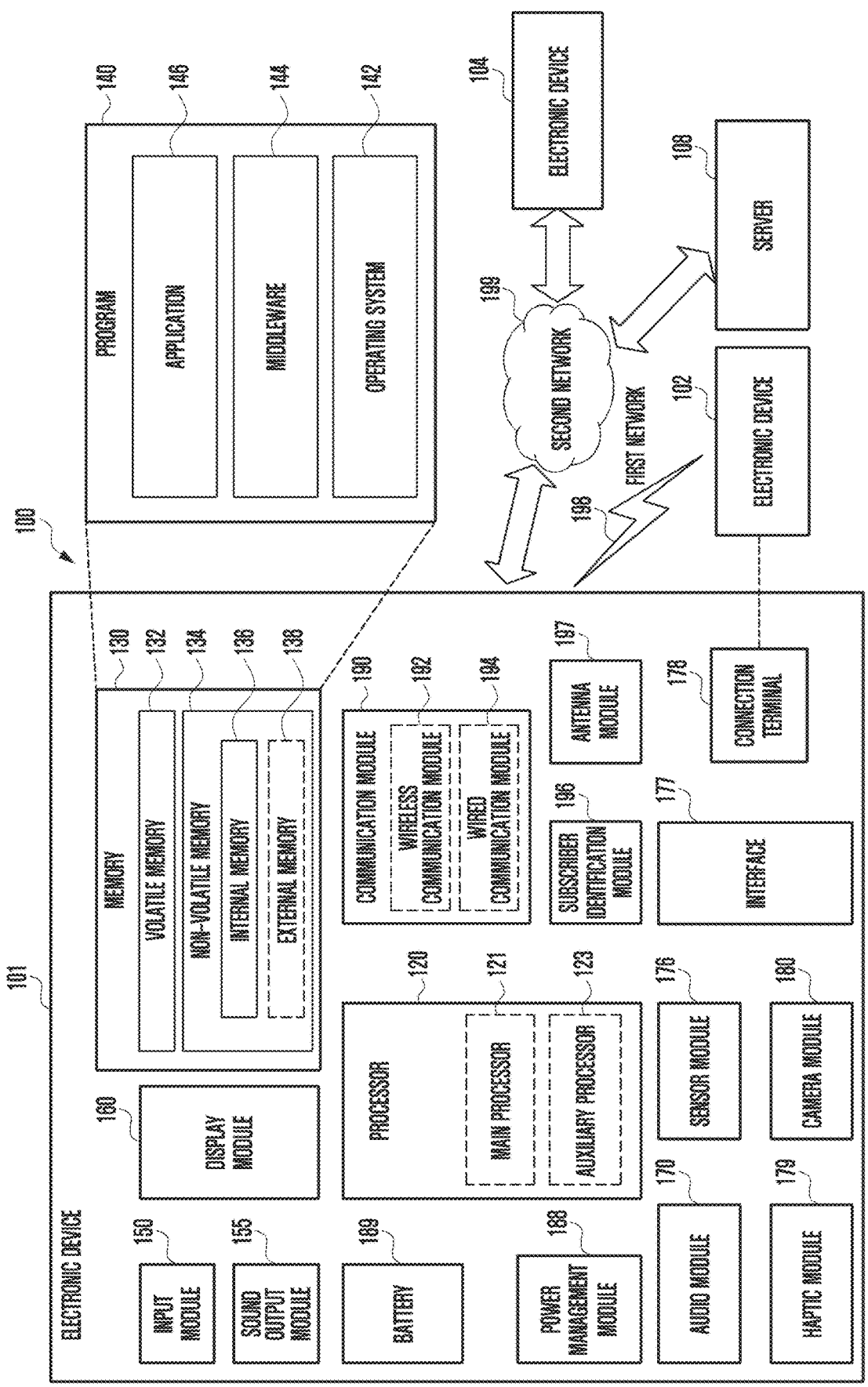
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
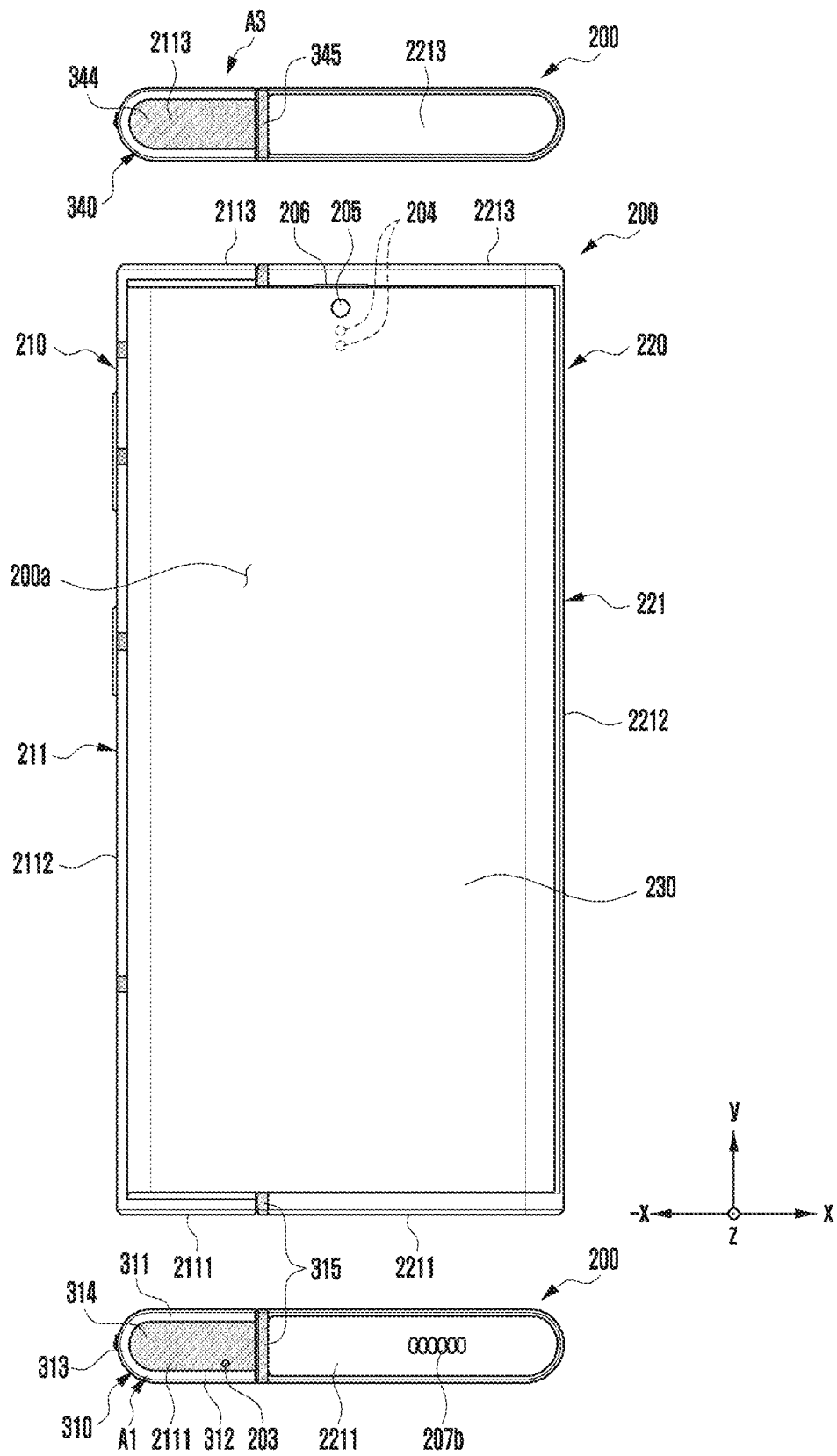
FIG. 2A is a diagram illustrating a front surface of an electronic device in a slide-in state according to various embodiments.
Figure 2B:
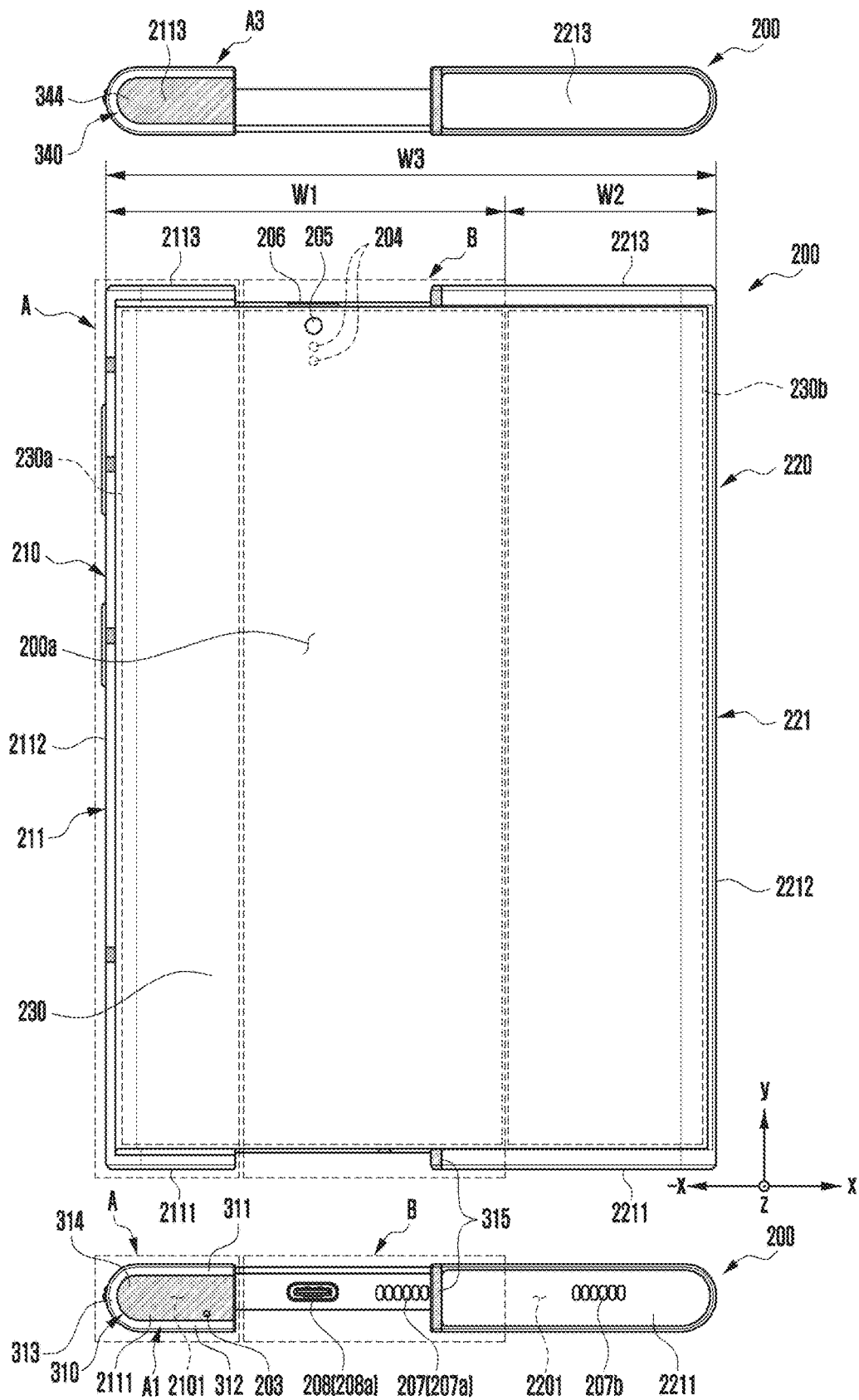
FIG. 2B is a diagram illustrating a front surface of an electronic device in a slide-out state according to various embodiments.
Figure 3A:
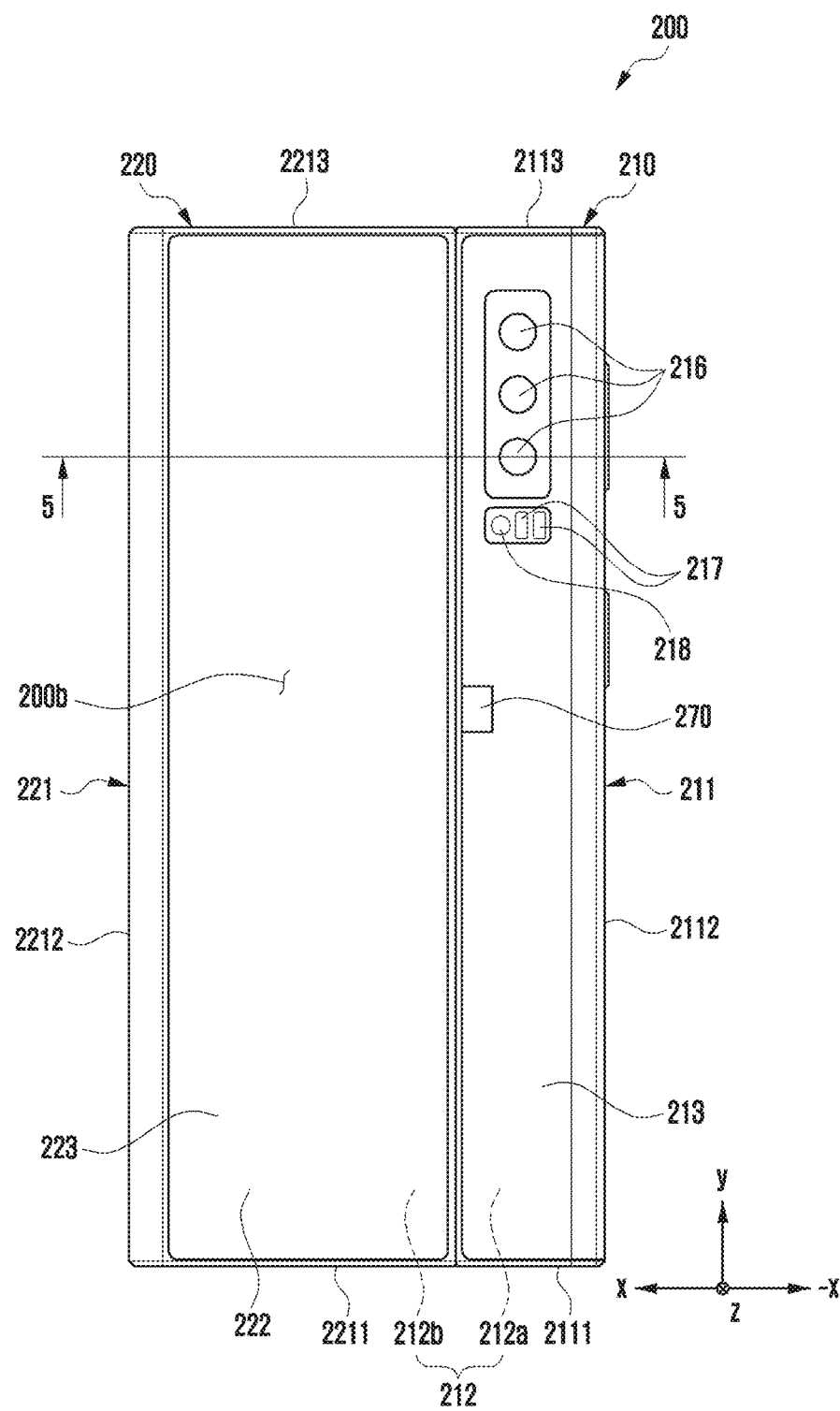
FIG. 3A is a diagram illustrating a rear surface of an electronic device in a slide-in state according to various embodiments.
Figure 3B:
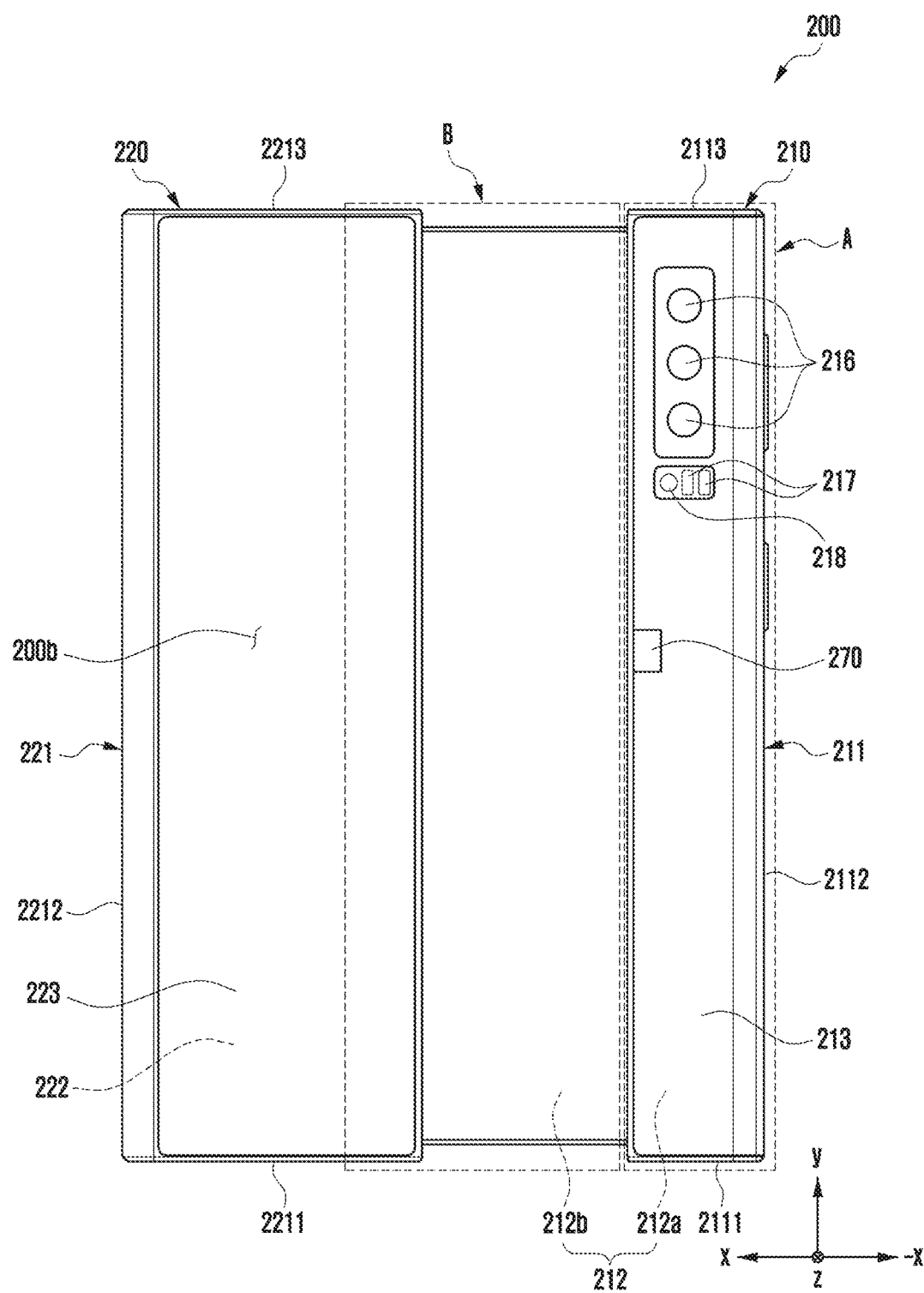
FIG. 3B is a diagram illustrating a rear surface of an electronic device in a slide-out state according to various embodiments.

FIG. 2A is a diagram illustrating a front surface of an electronic device in a slide-in state according to various embodiments. FIG. 2B is a diagram illustrating a front surface of an electronic device in a slide-out state according to various embodiments. FIG. 3A is a diagram illustrating a rear surface of an electronic device in a slide-in state according to various embodiments. FIG. 3B is a diagram illustrating a rear surface of an electronic device in a slide-out state according to various embodiments.

The electronic device 200 of FIGS. 2A, 2B, 3A and 3B (which may be referred to as FIGS. 2A to 3B) may be at least partially similar to the electronic device 101 of FIG. 1 or may further include other embodiments of the electronic device.

With reference to FIGS. 2A to 3B, the electronic device 200 may include a first housing 210 (e.g., a first housing structure or a base housing), a second housing 220 (e.g., a second housing structure or a slide housing) combined to move within the maximum movable distance in a designated first direction (e.g., the x-axis direction) from the first housing 210, and a flexible display 230 (e.g., an expandable display) disposed to be supported through at least a portion of the first housing 210 and second housing 220. According to an embodiment, the electronic device 200 may include a bendable member or bendable support member (e.g., bendable member 240 of FIG. 5) (e.g., an articulated hinge module) that in a slide-out state at least partially forms the same plane as at least a part of the first housing 210 and in a slide-in state is at least partially accommodated in the inner space of the second housing 220 (e.g., the second space 2201 in FIG. 5). According to an embodiment, at least a portion of the flexible display 230 is supported by a bendable member (e.g., the bendable member 240 in FIG. 5) in the slide-in state while being accommodated in the inner space (e.g., the second space 2201 of FIG. 5) of the second housing 220, and it may be arranged to be invisible from the outside. According to an embodiment, at least a portion of the flexible display 230 may be placed so that it is supported by a bendable member (e.g., the bendable member 260 of FIG. 5) forming at least partially the same plane as the first housing 210 in the slide-out state and seen from the outside.

According to various embodiments, the electronic device 200 may include a front surface 200*a* (e.g., a first surface), a rear surface 200*b* (e.g., a second surface) facing in the opposite direction to the front surface 200*a*, and a side surface (not shown) surrounding the space between the front surface 200*a* and the rear surface 200*b*. According to an embodiment, the electronic device 200 may include a first housing 210 including a first side surface member 211 and a second housing 220 including a second side surface member 221. According to an embodiment, the first side surface member 211 may include a first side surface 2111 having a first length along a first direction (x-axis direction), a second side surface 2112 extending from the first side surface 2111 to have a second length greater than the first length in a direction substantially perpendicular to the first side surface 2111, and a third side surface 2113 extending substantially parallel to the first side surface 2111 from the second side surface 2112 and having a first length. According to an embodiment, the first side surface member 211 may be at least partially formed of a conductive material (e.g., metal). According to an embodiment, at least a portion of the first side surface member 211 may include a first support member 212 extending to at least a portion of the inner space of the first housing 210 (e.g., the first space 2101 of FIG. 5).

According to various embodiments, the second side surface member 221 may include a fourth side surface 2211 at least partially corresponding to the first side surface 2111 and having a third length, a fifth side surface 2212 extending from the fourth side surface 2211 in a direction substantially parallel to the second side 2112 surface and having a fourth length greater than the third length, and a sixth side surface 2213 extending from the fifth side surface 2212 to correspond to the third side surface 2113 and having a third length. According to an embodiment, the second side surface member 221 may be at least partially formed of a conductive material (e.g., metal). According to an embodiment, at least a portion of the second side surface member 221 may include a second support member 222 that extends to at least a portion of the inner space of the second housing 220 (e.g., the second space 2201 of FIG. 5). According to an embodiment, the first side surface 2111 and the fourth side surface 2211 and the third side surface 2113 and the sixth side surface 2213 may be slidably coupled to each other. According to an embodiment, in the slide-in state, at least a portion of the first side surface 2111 overlaps with at least a portion of the fourth side surface 2211, so that the remaining portion of the first side 2111 surface may be arranged to be visible from the outside. According to an embodiment, in the slide-in state, at least a portion of the third side surface 2113 overlaps with at least a portion of the sixth side surface 2213, so that the remaining portion of the third side surface 2113 may be arranged to be visible from the outside.

According to an embodiment, in the slide-in state, at least a portion of the first support member 212 may overlap the second support member 222, and the remaining portion of the first support member 212 may be arranged to be visible from the outside. Accordingly, the first support member 212 may include, in the slide-in state, a non-overlapping portion 212a that does not overlap the second support member 222 and an overlapping portion 212b that overlaps the second support member 222. In various embodiments, the non-overlapping portion 212a and the overlapping portion 212b may be integrally formed. In various embodiments, the non-overlapping portion 212a and the overlapping portion 212b may be provided separately and may be structurally coupled. In various embodiments, the first support member 212, in the slide-in state, entirely overlaps the second support member 222, so that it may not be visible from the outside; and, in the slide-out state, a part thereof may be operated to be seen from the outside.

According to various embodiments, the first housing 210 may include, in the first space 2101, the first sub-space A corresponding to the non-overlapping portion 212a and the second sub-space B corresponding to the overlapping portion 212b. According to an embodiment, the first sub-space A and the second sub-space B may be disposed at least partially connected to each other or in a separated manner. According to an embodiment, the first sub-space A may have a shape different from that of the second sub-space B. This may be due to an overlapping structure in which the second support member 222 and the first support member 212 overlap in an area corresponding to the second sub-space B. According to an embodiment, the electronic device 200 may include a plurality of electronic components (e.g., camera module 216, sensor module 217, flash 218, main board (e.g., main board 250 in FIG. 4) or a battery (e.g., battery 251 in FIG. 4)) disposed in the first space of the first housing 210 (e.g., the first space 2101 of FIG. 5). According to an embodiment, the first sub-space A, for example, may be utilized as an area in which a relatively large mounting space is required (a relatively large mounting thickness is required) or electronic components (e.g., the camera module 216, the sensor module 217, or the flash 218) that must be operated by avoiding the overlapping structure are disposed. According to an embodiment, the second sub-space (B), for example, may be utilized as an area in which a relatively small mounting space is required (a relatively small mounting thickness is required) or electronic components (e.g., the main board 250 (PCB) of FIG. 4 or a battery (e.g., the battery 251 of FIG. 4)) that can be operated regardless of the overlapping structure are disposed.

According to various embodiments, the front surface 200a and the rear surface 200b of the electronic device 200 are variable in area depending on the slide-in state or slide-out state. According to an embodiment, the electronic device 200 may include, on the rear surface 200b, a first rear cover 213 disposed in at least a portion of the first housing 210, and a second rear cover 223 disposed in at least a portion of the second housing 220. According to an embodiment, the first rear cover 213 may be disposed on the first support member 212, and the second rear cover 223 may be disposed on the second support member 213. In various embodiments, the first rear cover 213 may be integrally formed with the first side member 211, and the second rear cover 223 may be integrally formed with the second side member 221. According to an embodiment, the first rear cover 213 and/or the second rear cover 223 may be formed of polymer, coated or colored glass, ceramic, metal (e.g., aluminum, stainless steel (STS), or magnesium), or a combination of at least two of the above materials. In various embodiments, the first rear cover 213 may extend to at least a portion of the first side member 211, and the second rear cover 223 may extend to at least a portion of the second side member 221. In various embodiments, at least a portion of the first support member 212 may be replaced with the first rear cover 213, and at least a portion of the second support member 222 may be replaced with the second rear cover 223.

According to various embodiments, the electronic device 200 may include a flexible display 230 disposed to receive support of at least a portion of the first housing 210 and the second housing 220. According to an embodiment, the flexible display 230 may include a first portion 230a that is always visible from the outside (e.g., a flat portion) and a second portion 230b (e.g., bendable portion) extending from the first portion 230a and at least partially introduced into the inner space of the second housing 220 (e.g., the first space 2201 in FIG. 5) so as not to be seen from the outside in the slide-in state. According to an embodiment, the first portion 230a may be disposed to receive the support of the first housing 210 and the second portion 230b may be at least partially disposed to be supported by a bendable member (e.g., the bendable member 240 of FIG. 5). According to an embodiment, the flexible display 230, while the second housing 220 is supported by the bendable member (e.g., the bendable member 240 of FIG. 5) in a state in which the second housing 220 is slid-out along the designated first direction (x-axis direction), may extend from the first portion 230a, form a plane substantially the same as or similar to the first portion 230a, and may be arranged to be visible from the outside. According to an embodiment, the second portion 230b of the flexible display 230, in a state in which the second housing 220 is retracted along the designated second direction (−x-axis direction), may be introduced into the inner space of the second housing 220 (e.g., the second space 2201 of FIG. 5) and may be disposed so as not to be seen from the outside. Accordingly, in the electronic device 200, the display area of the flexible display 230 may vary as the second housing 220 slides along a designated direction from the first housing 210.

According to various embodiments, the first housing 210 and the second housing 220 may be operated in a sliding manner so that the overall width with respect to each other is variable. According to an embodiment, the electronic device 200 may be configured to have a first width W1 from the second side surface 2112 to the fourth side surface 2212 in the slide-in state. According to an embodiment, in the electronic device 200 in the slide-out state, a portion of the bendable member (e.g., the bendable member 240 of FIG. 5) introduced into the internal space (e.g., the second space 2201 of FIG. 5) of the second housing 210 is moved to have an additional second width W2, and it may be configured to have a third width W3 larger than the first width W1. For example, the flexible display 230 may have a display area substantially corresponding to the first width W1 in the slide-in state, and it may have an extended display area substantially corresponding to the third width W3 in the slide-out state.

According to various embodiments, the slide-out operation of the electronic device 200 may be performed through a user's manipulation. For example, the second housing 220 may be slid-out in a designated first direction (e.g., the x-axis direction) through manipulation of a locker 270 exposed through the rear surface 200b of the electronic device. In this case, the locker 270 is disposed in the first housing 210 and may control the second housing 220 in order to maintain the second housing 220 that is always pressed in the slide-out direction (e.g., the x-axis direction) through the support assembly 260 of FIG. 4 to be described in greater detail below in the slide-out state. In various embodiments, the electronic device 200, in the slide-in state, may be transitioned to the slide-out state through a user's manipulation of pressing the outer surface of the flexible display 230 in a designated first direction (x-axis direction). In various embodiments, the second housing 220 may also be operated automatically via a deployed drive mechanism (e.g. drive motor, reduction module, or gear assembly) disposed at either or both the internal space of the first housing 210 (e.g., the first space 2101 of FIG. 5) or the internal space of the second housing 220 (e.g., the second space 2201 of FIG. 5). According to an embodiment, when the electronic device 200 detects an event for transition of the slide-in/slide-out state of the electronic device 200 through a processor (e.g., the processor 120 of FIG. 1), the electronic device 200 may be set to control the operation of the second housing 220 using a driving mechanism. In various embodiments, the processor of the electronic device 200 (e.g., the processor 120 of FIG. 1), depending on a slide-in state, slide-out state, or intermediate state (e.g. free stop state) and in response to the changed display area of the flexible display 230, may control the flexible display 230 to display an object in various ways and execute an application program. The intermediate state may refer to, for example, any one state between the slide-out state and the slide-in state. For example, in the intermediate state, the display region of the screen may be between the display region in the slide-out state and the display region in the slide-in state.

Figure 5:
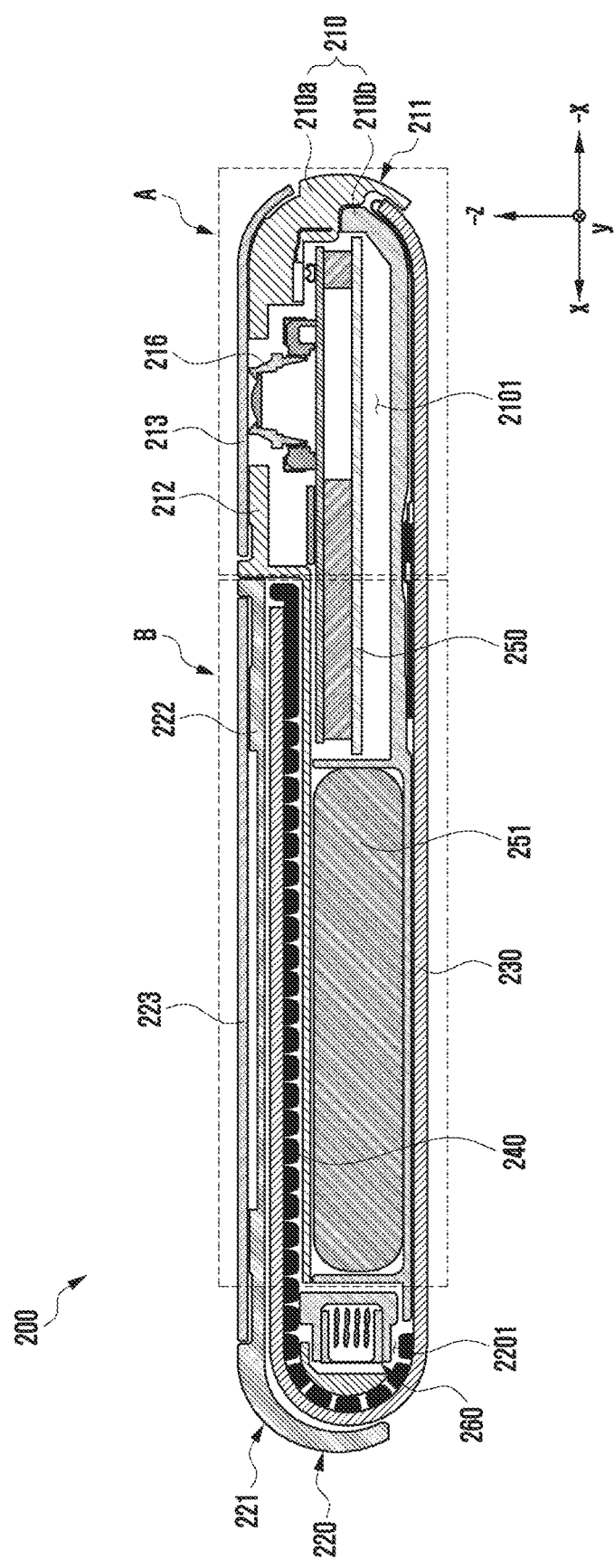
FIG. 5 is a cross-sectional view of an electronic device taken along line 5-5 of FIG. 3A according to various embodiments.

According to various embodiments, the electronic device 200 may include at least one of an input device 203, sound output devices 206, 207, sensor modules 204, 217, camera modules 205, 216, a connector port 208, a keystroke device (not shown), or an indicator (not shown) which are disposed in the first space of the first housing 210 (e.g., the first space 2101 of FIG. 5). In an embodiment, the electronic device 200 may be configured such that at least one of the above-described components is omitted or other components are additionally included.

According to various embodiments, the input device 203 may include a microphone. In various embodiments, the input device 203 may include a plurality of microphones arranged to sense the direction of sound. The sound output devices 206 and 207 may include speakers. For example, the sound output devices 206 and 207 may include a receiver 206 for a call and an external speaker 207. According to an embodiment, the external speaker 207 may face the outside through the first speaker hole 207a disposed in the first housing 210 in the slide-out state. According to an embodiment, the external speaker 207, in the slide-in state, may be connected to the outside through the first speaker hole 207a and the second speaker hole 207b formed in the second housing 220 to correspond to the first speaker hole 207a. According to an embodiment, the connector port 208 may face the outside through the connector port hole 208a formed in the first housing 210 in the slide-out state. According to an embodiment, the connector port 208 may be hidden from view through the second housing 220 in the slide-in state. In various embodiments, the connector port 208 may face the outside through another connector port hole formed in the second housing 220 to correspond to the connector port hole 208a even in the slide-in state. In various embodiments, the sound output device 206 may include a speaker (e.g., a piezo speaker) that operates while excluding a separate speaker hole.

According to various embodiments, the sensor modules 204 and 217 may generate an electrical signal or data value corresponding to an internal operating state of the electronic device 200 or an external environmental state. The sensor modules 204 and 217, for example, may include a first sensor module 204 (e.g., a proximity sensor or an illuminance sensor) disposed on the front surface 200a of the electronic device 200 and a second sensor module 217 (e.g., a heart rate monitoring (HRM) sensor) disposed on the rear surface 200b. According to an embodiment, the first sensor module 204 may be disposed below the flexible display 230 on the front surface 200a of the electronic device 200. According to an embodiment, the first sensor module 204 and the second sensor module 217 may include at least one of a proximity sensor, light sensor, time of flight (TOF) sensor, ultrasonic sensor, fingerprint sensor, gesture sensor, gyro sensor, barometric pressure sensor, magnetic sensor, accelerometer, grip sensor, color sensor, IR (infrared) sensor, biometric sensor, temperature sensor, or humidity sensor.

According to various embodiments, the camera modules 205 and 216 may include a first camera module 205 disposed on the front surface 200a of the electronic device 200 and a second camera module 216 disposed on the rear surface 200b of the electronic device 200. According to an embodiment, the electronic device 200 may include a flash 218 positioned near the second camera module 216. According to an embodiment, the camera modules 205, 216 may include one or more lenses, an image sensor, and an image signal processor. According to an embodiment, the first camera module 205 may be disposed under the flexible display 230 and may be configured to photograph a subject through a portion of an active area of the flexible display 230. According to an embodiment, the flash 218 may include, for example, a light emitting diode or a xenon lamp.

According to various embodiments, the first camera module 205 of the camera modules 205 and 216 and some sensor modules 204 of the sensor modules 204 and 217 may be arranged to detect the external environment through the flexible display 230. For example, the first camera module 205 or some sensor modules 204 may be disposed in the internal space of the electronic device 200 so as to be in contact with the external environment through an opening or a transparent area perforated in the flexible display 230. According to an embodiment, the area facing the first camera module 205 of the flexible display 230 may be formed as a transparent area having a designated transmittance as a part of an area displaying content. According to an embodiment, the transmissive region may be formed to have a transmittance ranging from about 5% to about 20%. Such a transmissive region may include a region overlapping an effective region (e.g., an angle of view region) of the first camera module 205 through which light for generating an image by being imaged by an image sensor passes. For example, the transparent area of the flexible display 230 may include an area having a lower pixel density or wiring density or both than the surrounding area. For example, the transmissive area may replace the aforementioned opening. For example, some camera modules 205 may include an under display camera (UDC). In various embodiments, some sensor modules 204 may be arranged to perform their functions without being visually exposed through the flexible display 230 in the internal space of the electronic device 200.

According to various embodiments, the electronic device 200 may include at least one conductive portion as an antenna A1 (e.g., an antenna structure or an antenna radiator) electrically connected to a wireless communication circuit (e.g., the wireless communication module 192 in FIG. 1) disposed in the first space 2101 of the first housing 210. According to an embodiment, the at least one conductive portion may include a first conductive portion 310 disposed through at least a portion of the first side surface 2111 of the first housing 210. According to an embodiment, a non-conductive portion 314 may be disposed on the first conductive portion 310. In various embodiments, the first conductive portion 310 may be spaced apart from the surrounding conductive material by a non-conductive portion 315 disposed on the fourth side surface 2211 of the second housing 220 in the slide-in state.

According to various embodiments, the first conductive portion 310, in the first side surface 2111, may include a first portion 311 formed with a specified width to have a length along the first direction (x-axis direction), a second portion 312 spaced apart from the first portion 311 at a specified interval and formed with a specified width to have a length along the first direction (x-axis direction), and a third portion 313 connecting one end of the first portion 311 and one end of the second portion 312. According to an embodiment, the first portion 311, the second portion 312, and the third portion 313 may be integrally formed. In various embodiments, the length of the first portion 311 and the second portion 312 may be substantially the same. In various embodiments, the lengths of the first portion 311 and the second portion 312 may be different from each other. According to an embodiment, the third portion 313 may be disposed at a position adjacent to the second side surface 2112. According to an embodiment, the first conductive portion 310, in the first side surface 3111, at the slide-in state, not covered by the fourth side surface 2211 of the second housing 220, but always disposed in an area exposed to the outside, may help to develop stable radiation performance of the antenna regardless of a sliding operation. According to an embodiment, the first conductive portion 310 may be formed in a "U" shape. In various embodiments, the first conductive portion 310 may be formed in a "C" shape.

According to various embodiments, the electronic device 200, in substantially the same manner as the antenna A1 using the first conductive portion 310 disposed on the first side surface 2111 of the first housing 210, in the third side surface, may further include another antenna A3 with another conductive portion 340 disposed through non-conductive portions 344, 345.

Figure 4:
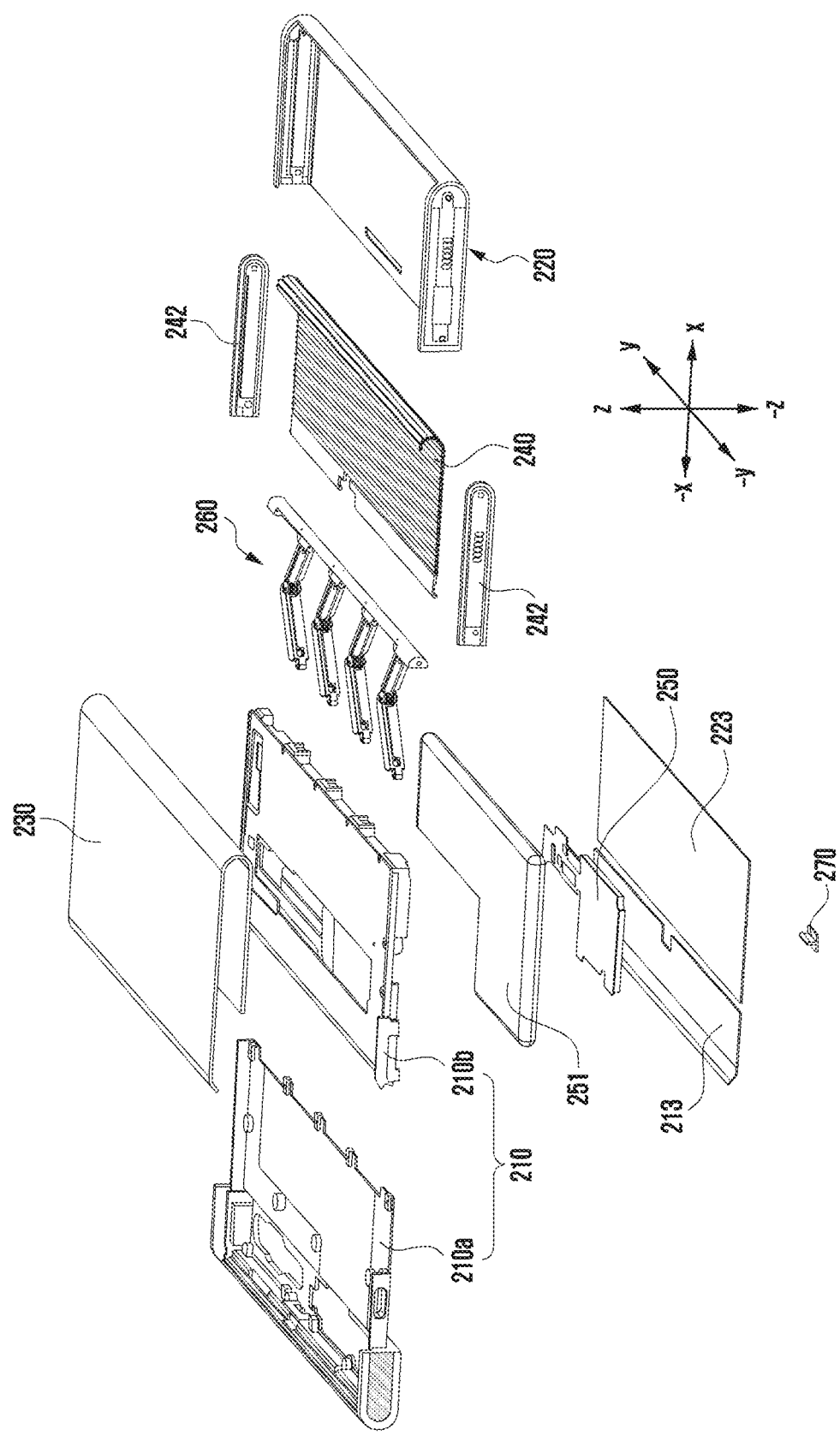
FIG. 4 is an exploded perspective view illustrating an electronic device according to various embodiments.

FIG. 4 is an exploded perspective view of an electronic device according to various embodiments.

With reference to FIG. 4, the electronic device 200 may include a first housing 210 including a first space (e.g., the first space 2101 of FIG. 5), a second housing 220 which is slidably coupled to the first housing 210 and includes a second space (e.g., the second space 2201 in FIG. 5), a bendable member 240 which is at least partially rotatably disposed in the second space (e.g., the second space 2201 of FIG. 5), and a flexible display 230 which is disposed to be supported by at least a portion of the bendable member 240 and the first housing 210. According to an embodiment, the first space of the first housing 210 (e.g., the first space 2201 in FIG. 5) may be provided through the combination of the first bracket housing 210a and the second bracket housing 210b. In various embodiments, at least a portion of the first bracket housing 210a may include a first support member (e.g., the first support member 212 of FIG. 3B) or may be replaced with the first support member 212. According to an embodiment, the electronic device 200 may include a main board 250 disposed in the first space (e.g., the first space 2201 of FIG. 5). According to an embodiment, the electronic device 200 may include a camera module (e.g., the camera module 216 of FIG. 3A) or a sensor module (e.g., the sensor module 217 of FIG. 3A) disposed in the first space (e.g., the first space 2101 of FIG. 5). According to an embodiment, the bendable member 240 may be disposed as one end is fixed to the first housing 210 and the other end is at least partially rotatably accommodated in the second space (e.g., the second space 2201 of FIG. 5) of the second housing 220. For example, the bendable member 240, in the slide-in state, may be at least partially accommodated in the second space (e.g., the second space 2201 in FIG. 5); and, in the slide-out state, may be at least partially slid-out from the second space (e.g., the second space 2201 of FIG. 5) to form substantially the same plane as the first housing 210. Accordingly, the first housing 210 or the flexible display 230 supported by the bendable member 240 may have a variable display area according to a sliding operation. According to an embodiment, the electronic device 200 is disposed on side surfaces of the combined first bracket housing 210a and the second bracket housing 210b, and it may further include a guide rail 242 to be guided in the inner space of the second housing 220 (e.g., the second space 2201 of FIG. 5). In various embodiments, the electronic device 200 may further include a cover member (not shown) disposed to cover both sides of the second support member (e.g., the second support member 222 of FIG. 3B) of the second housing 220.

According to various embodiments, the electronic device 200 may include a support assembly 260 that is disposed from the first housing 210 toward the second space (e.g., the second space 2201 of FIG. 5) and presses the second housing 220 in a direction to be drawn out. According to an embodiment, the support assembly 260 may reduce the sagging phenomenon of the flexible display 230 by supporting the bendable member 240 during operation. According to an embodiment, the support assembly 260, in a manner that is fixed to the first housing 210 and presses the rear surface of the bendable member 240, may guide the second housing 220 in a direction to be slid-out. According to an embodiment, the electronic device 200 may include a locker 270 for maintaining the electronic device 200 in the slide-in state while interrupting the pressing force by the support assembly 260. According to an embodiment, the locker 270 is movably disposed in the first housing 210 and, in the slide-in state, may control the movement of the second housing 220 in the slide-out direction.

FIG. 5 is a cross-sectional view of an electronic device taken along line 5-5 of FIG. 3A according to various embodiments.

With reference to FIG. 5, the electronic device 200 may include the first housing 210 having the first space 2101, the second housing 220 having the second space 2201, the bendable member 240 connected to the first housing and accommodated at least partially in the second space 2201 in the slide-in state, the flexible display 230 disposed to be supported by at least a portion of the bendable member 240 and at least a portion of the first housing 210, and the support assembly 260 disposed in the first housing 210 and pressing the second housing 220 in a slide-out direction (e.g., the x-axis direction). According to an embodiment, the electronic device 200 may include a plurality of electronic components. According to an embodiment, the plurality of electronic components may be disposed in the first space 2101 of the first housing 210. According to an embodiment, the first space 2101 may include a first sub-space (A) having a first spatial volume and a second sub-space (B) connected to the first sub-space (A) and having a shape different from that of the first space. According to an embodiment, the second sub-space (B) may have a space corresponding to a region in which a portion of the first housing 210 overlaps with a portion of the second housing 220 when the electronic device is in the slide-in state.

According to various embodiments, among the plurality of electronic components, first electronic components that need a relatively large arrangement space, need a relatively large arrangement thickness of the electronic device 200, or have to operate while avoiding an overlapping structure of the two housings 210 and 220 may be disposed in the first sub-space (A). According to an embodiment, the first electronic components may include the camera module 216, a sensor module (e.g., the sensor module 217 in FIG. 3B), or a flash (e.g., the flash 218 in FIG. 3B). In this case, at least some of the first electronic components may be disposed to face the external environment through the first support member 212 and/or the first rear cover 213. According to an embodiment, among the plurality of electronic components, second electronic components that need a relatively small arrangement space, need a relatively small arrangement thickness of the electronic device 200, or can operate regardless of the overlapping structure of the two housings 210 and 220 may be disposed in the second sub-space (B). According to an embodiment, the second electronic components may include the main board 250 and/or the battery 251. In various embodiments, when the first sub-space (A) and the second sub-space (B) are connected, some electronic components (e.g., the main board 250 or FPCB) among the plurality of electronic components may be disposed in the two sub-spaces.

According to an embodiment, the electronic device 200 may include a distance sensor (e.g., the sensor module 176 in FIG. 1) for detecting (or measuring) at least one of a state of the electronic device 200 (e.g., a movement start, a movement, and/or a movement stop of the second housing 220) and a moving distance of the second housing 220 resulting from the movement of the bendable member 240. For example, the distance sensor may include a Hall sensor. The Hall sensor may be disposed in at least one mechanism (e.g., the first bracket housing 210a, the second bracket housing 210b, and/or the support assembly 260 in FIG. 5) included on or in at least a portion of the housings 210 and 220 of the electronic device 200a, but this is not a limitation. According to various embodiments, it will be readily understood by those skilled in the art that there is no limitation on information detected by the distance sensor and types of the distance sensor. For example, the distance sensor is capable of measuring a distance between the first housing 210 (or a mechanism disposed inside the first housing 210) and the second housing 220 (or a mechanism disposed inside the second housing 220) and/or the relative positions of the first and second housings 210 and 220. In another example, the distance sensor may include a sensor that measures the position of the second housing 220 from a change in electric signals caused by the movement of a conductive member disposed in at least one mechanism (e.g., the first bracket housing 210a, the second bracket housing 210b, the support assembly 260, and/or a flexible printed circuit board (FPCB) (not shown)) included on the rear surface of the flexible display 230 and/or inside the housings 210 and 220. In still another example, when the electronic device 200 includes a motor as a driving unit, the distance may be measured based on an operating state and/or degree of the motor. Hereinafter, for convenience of description, an embodiment in which the distance sensor (e.g., the Hall sensor) measures the moving distance of the second housing will be mainly described. The moving distance may include, for example, but is not limited to, an actual moving distance, a moving degree, a relative position, or a moving degree determined by the processor (e.g., the processor 120 in FIG. 1) mapping to a sensing value (e.g., a magnitude value of a magnetic force) received from the sensor.

According to an embodiment, using the distance sensor, the electronic device 200 may detect a sliding operation of the housings 210 and 220 and identify the positions of the housings 210 and 220. According to an embodiment, depending on the sliding operation, a screen display region (e.g., area and size) of the flexible display 230 may be variable at least in part.

According to various embodiments, using the distance sensor, the electronic device 200 may measure a moving distance of the housing (e.g., the second housing 220) and, based on the measured moving distance, determine the screen display region of the flexible display 230. The electronic device 200 may provide a user interface (UI) to the user, based on the determined screen display region.

Figure 6:
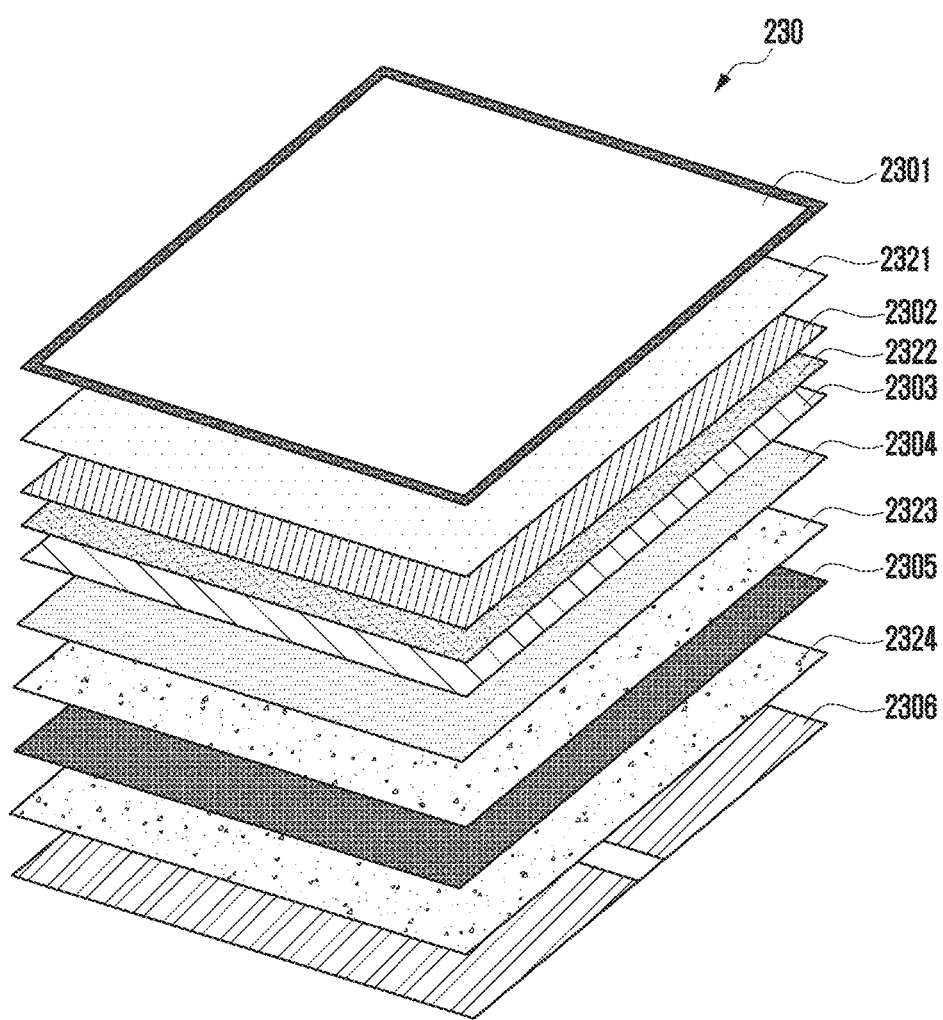
FIG. 6 is an exploded perspective view illustrating a stacked structure of a flexible display of an electronic device according to various embodiments.

FIG. 6 is an exploded perspective view illustrating a stacked structure of a flexible display 230 of an electronic device according to various embodiments.

With reference to FIG. 6, the flexible display 230 may include a window 2301 (e.g., polyimide (PI) film, polyethylene terephthalate (PET), or ultra-thin glass (UTG)) and also include a polarizing layer or polarizer 2302 (e.g., a polarizing film), a touch panel 2303, a display panel 2304, a polymer member 2305, and/or a conductive plate 2306 which are sequentially disposed on the rear surface of the window 2301. According to an embodiment, the window 2301, the polarizing layer 2302, the touch panel 2303, the display panel 2304, the polymer member 2305, and/or the conductive plate 2306 may be disposed to cross at least a portion of a first side member (e.g., the first side member 211 in FIG. 2A) of a first housing (e.g., the first housing 210 in FIG. 2A) and a second side member (e.g., the second side member 221 in FIG. 2A) of a second housing (e.g., the second housing 220 in FIG. 2A).

According to an embodiment, the window 2301, the polarizing layer 2302, the touch panel 2303, the display panel 2304, the polymer member 2305, and the conductive plate 2306 may be attached to each other through adhesive members 2321, 2322, 2323, and 2324. For example, the adhesive members 2321, 2322, 2323, and 2324 may include at least one of an optical clear adhesive (OCA), a pressure sensitive adhesive (PSA), a heat-reactive adhesive, a photo-reactive adhesive, a general adhesive, and/or a double-sided tape. According to an embodiment, the flexible display 230 may include another adhesive member (not shown) (e.g., a double-sided tape or a waterproof member) disposed along edges of one surface (e.g., the rear surface) of the conductive plate 2306. According to an embodiment, the flexible display 230 may be attached to a support assembly (e.g., the support assembly 260 in FIG. 4) of an electronic device (e.g., the electronic device 200 in FIG. 4) through still another adhesive member (not shown).

According to an embodiment, the polarizing layer or polarizer 2302 (e.g., the polarizing film) may include a retardation layer or retarder. The polarization layer and the retardation layer can improve the outdoor visibility of the screen.

According to an embodiment, the flexible display 230 may not include the polarizing layer 2302 (e.g., a circular retarder) and may include a color filter layer (not shown) in the form of a color filter on encapsulation (COE).

Figure 7:
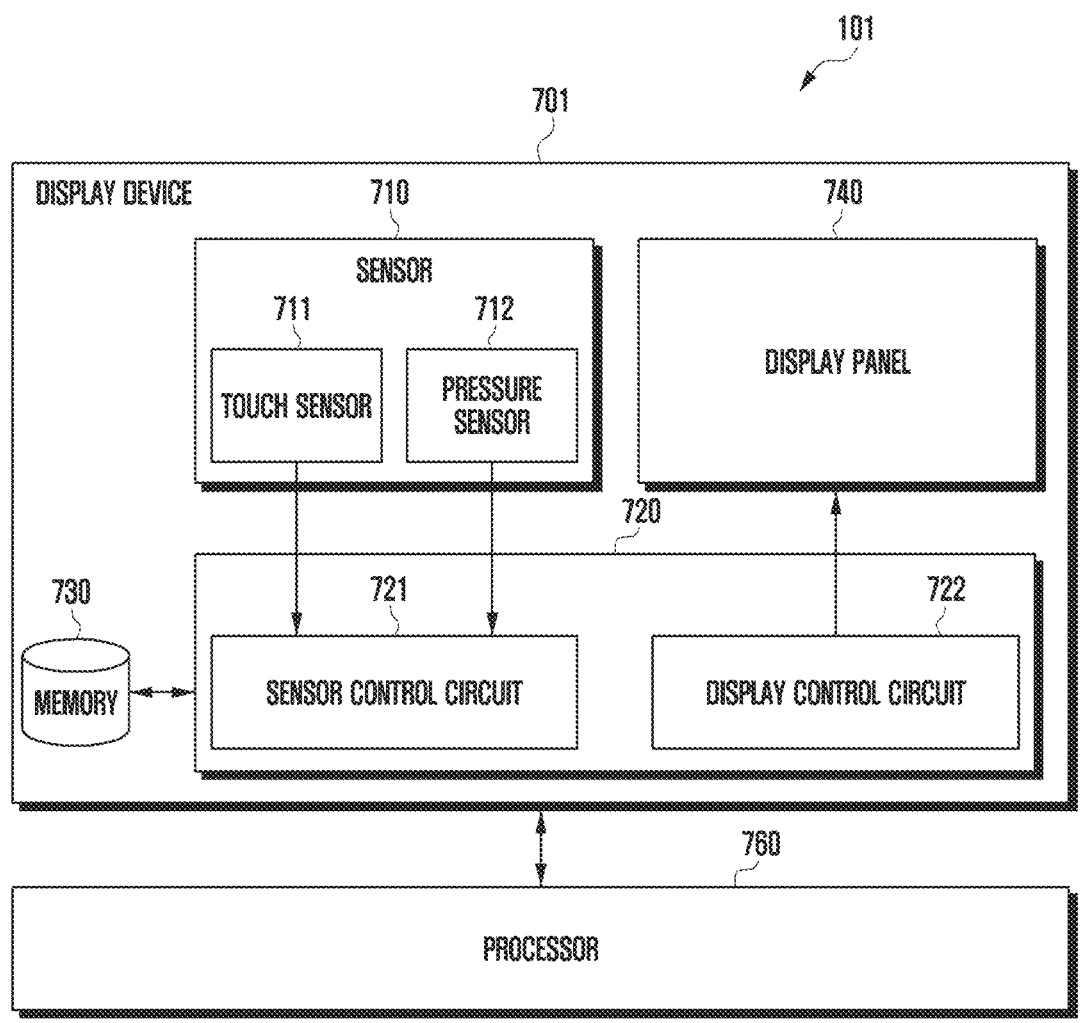
FIG. 7 is a block diagram illustrating an example configuration of the electronic device according to various embodiments.

According to an embodiment, the touch panel 2303 may include a touch sensor (e.g., the touch sensor 711 in FIG. 7). The touch sensor 711 may be electrically connected to a sensor control circuit (e.g., the sensor control circuit 721 in FIG. 7). In various embodiments, the sensor control circuit 721 may be implemented in a touch sensor driving circuit, but this is merely an example. At least some functions of the sensor control circuit 721 may be performed by a processor (e.g., the processor 120 in FIG. 1) of an electronic device (e.g., the electronic device 101 in FIG. 1). The touch sensor 711 included in the touch panel 2303 may include a plurality of electrodes. For example, first electrodes included in the touch sensor 711 may extend in a vertical direction, and second electrodes may extend in a horizontal direction. The first and second electrodes may be implemented, for example, in the form of a mesh, and the number of the first and second electrodes is not limited. According to an embodiment, the touch sensor 711 may be implemented as a transparent conductive layer (or film) based on various conductive materials such as indium tin oxide (ITO).

According to various embodiments, the touch sensor 711 may be implemented separately from the display panel 2304 or may be implemented integrally with the display panel 2304. For example, the touch sensor 711 may be implemented as the on-cell touch active matrix organic light-emitting diode (on-cell touch AMOLED (OCTA)), and in this case the touch sensor 711 may be directly deposited on the AMOLED display. In another example, the touch sensor 711 may be implemented as the Youm-OCTA (Y-OCTA), and in this case the plurality of touch sensors may be directly deposited on the flexible AMOLED display. For example, the display panel 2304 may include the touch panel 2303 and thereby have a touch sensing function (e.g., an in-cell type). According to an embodiment, the touch panel 2303 may further include a pressure sensor (e.g., the pressure sensor 712 in FIG. 7). For example, the pressure sensor 712 may be located outside the touch panel 2303. The pressure sensor 712 may include a plurality of resistors, which may be formed to be at least partially similar to the arrangement of the touch sensor 711.

According to an embodiment, the display panel 2304 may include the organic light emitting diodes (OLED). For example, the display panel 2304 may include an unbreakable (UB) type OLED display (e.g., a curved display).

According to various embodiments, a dark color (e.g., black) may be applied to the polymer member 2305 to help display the background while the flexible display 230 is turned off. According to an embodiment, the polymer member 2305 may include a cushion member for absorbing an impact from the outside of the electronic device 101 and preventing/reducing the flexible display 230 from being damaged. Like the cushion member, the polymer member 2305 may absorb an external impact.

According to an embodiment, the conductive plate 2306, which is in the form of a metal sheet, may be used to reinforce the rigidity of the electronic device 101, shield ambient noise, and dissipate heat radiated from surrounding heat-generating components. According to an embodiment, the conductive plate 2306 may include at least one of Cu, Al, steel use stainless (SUS) (e.g., stainless steel (STS)), CLAD (e.g., a laminated member in which SUS and Al are alternately disposed), and/or any other alloy material.

According to various embodiments, the flexible display 230 may include at least one functional member (not shown) disposed between the polymer member 2305 and the conductive plate 2306. According to an embodiment, the functional member may include at least one of a graphite sheet for heat dissipation, an added display, a force touch FPCB, a fingerprint sensor FPCB, an antenna radiator for communication, a heat dissipation sheet, a conductive/non-conductive tape, and/or an open cell sponge.

FIG. 7 is a block diagram illustrating an example configuration of an electronic device (e.g., the electronic device 101 in FIG. 1) according to various embodiments. The electronic device (e.g., the electronic device 101 in FIG. 1) is not limited to FIG. 7 and may include more or fewer components than the components shown in FIG. 7.

According to various embodiments, as shown in FIG. 7, the electronic device (e.g., the electronic device 101 in FIG. 1) may include a display device 701 (e.g., the display module 160 in FIG. 1) and a processor (e.g., including processing circuitry) 760 (e.g., the processor 120 in FIG. 1). The display device 701 may include a sensor 710 including a touch sensor 711 and a pressure sensor 712, a control circuit 720 including a sensor control circuit 721 and a display control circuit 722, a memory 730 (e.g., the memory 130 in FIG. 1), and a display panel 740.

According to various embodiments, the sensor control circuit 721 may identify a value related to an input by an external object (e.g., a user's touch input, a collision with an object) received on a flexible display (e.g., the display device 701, the flexible display 230 in FIG. 2A) using at least one of the touch sensor 711 and the pressure sensor 712. For example, the sensor control circuit 721 may identify a value related to characteristics (e.g., at least one of a touch position (coordinates), a touch area, a touch sensitivity, a touch drag distance, and/or a touch hold time) associated with an input by an external object (e.g., a user's touch) and a value related to characteristics (e.g., pressure sensitivity) associated with pressure. In another example, the sensor control circuit 721 may include components for detecting touch-associated characteristics and pressure-associated characteristics, respectively. For example, the sensor control circuit 721 may include a touch sensor panel integrated circuit (touch sensor panel IC, TSP IC) for identifying a value related to touch-associated characteristics (e.g., touch coordinates, a touch area, a touch sensitivity, a touch drag distance, and/or a touch hold time), and a pressure sensor panel IC for identifying a value related to pressure-associated characteristics (e.g., pressure sensitivity).

According to various embodiments, the sensor control circuit 721 may identify, using the touch sensor 711, a value related to an input by an external object (e.g., a user's touch input, a collision with an object) received on the flexible display 230. The sensor control circuit 721 may drive (e.g., apply power) the touch sensor 711 and identify an electrical value (e.g., at least one of a voltage value or a current value), or a change thereof, generated based on the applied power from the touch sensor 711 by the received input. For example, the touch sensor 711 may output an electrical value in response to the received input. From the touch sensor 711, the sensor control circuit 721 may identify at least one a touch-related value (e.g., a value indicating the touch sensitivity, a value indicating the touch area, and/or a value indicating the touch coordinates) previously stored in the electronic device 101 corresponding to the identified electrical value or its change. The sensor control circuit 721 may transmit information (e.g., touch information) about the identified at least one value to the processor 760. The sensor control circuit 721 may determine a touch type (e.g., a normal touch, a drag touch, a palm touch, and/or a pinch) according to an input that satisfies a specified condition (e.g., a pressure greater than a specific value, a touch area greater than a specific value, or a touch movement greater than a specific value), based on the identified at least one value, and transmit a corresponding touch event to the processor 760. The sensor control circuit 721 may also transmit raw data for the touch event to the processor 760 so that the processor 760 may process the touch input. According to an embodiment, the touch sensor 711 may include, but is not limited to, at least one touch sensor of a contact capacitive type, a pressure resistance film type, an infrared sensing type, a surface ultrasonic conduction type, and/or a piezo effect type.

According to various embodiments, the sensor control circuit 721 may identify, using the pressure sensor 712, a value related to a pressure of an input by an external object (e.g., a user's touch input, a collision with an object) received on the flexible display 230. The sensor control circuit 721 may drive (e.g., apply power) the pressure sensor 712 and identify an electrical value (e.g., at least one of a voltage value or a current value), or a change thereof, generated based on the applied power from the pressure sensor 712.

According to various embodiments, the memory 730 may store various data related to the display panel 740 and/or the sensor 710. For example, the memory 730 may store information (e.g., location and/or range) of a display region of the display panel 740 referenced by the display control circuit 722. Also, the memory 730 may store information (e.g., location and/or touch information of a designated type) related to an edge region of the touch sensor 711 referenced by the sensor control circuit 721. Although the memory 730 is illustrated as being included in the sensor control circuit 721, it may be included in an electronic device (e.g., the electronic device 101 in FIG. 1, the electronic device 200 in FIG. 2A) separately from the sensor control circuit 721.

According to various embodiments, the display control circuit 722 may control the display panel 740 to display a graphic user interface (GUI). The display control circuit 722 may be a display driver IC (DDI). According to various embodiments, the display device 701 may be a DDI package. For example, the DDI package may include at least one of the DDI (or a DDI chip), a timing controller (T-CON), a graphics RAM (GRAM), and/or power generating circuits.

According to various embodiments, the processor 760 (e.g., the processor 120 in FIG. 1) may include various processing circuitry and control the components of the electronic device (e.g., the electronic device 101 in FIG. 1, the electronic device 200 in FIG. 2A). For example, the processor 760 may control the components of the electronic device (e.g., the electronic device 101 in FIG. 1, the electronic device 200 in FIG. 2A) to perform at least one corresponding operation based on the event corresponding to touch information or input received from the sensor control circuit 721.

Meanwhile, those skilled in the art will readily understand that the operations of the above-described components may be configured to be performed by the processor 760 (e.g., the processor 120 in FIG. 1).

Figure 8A:
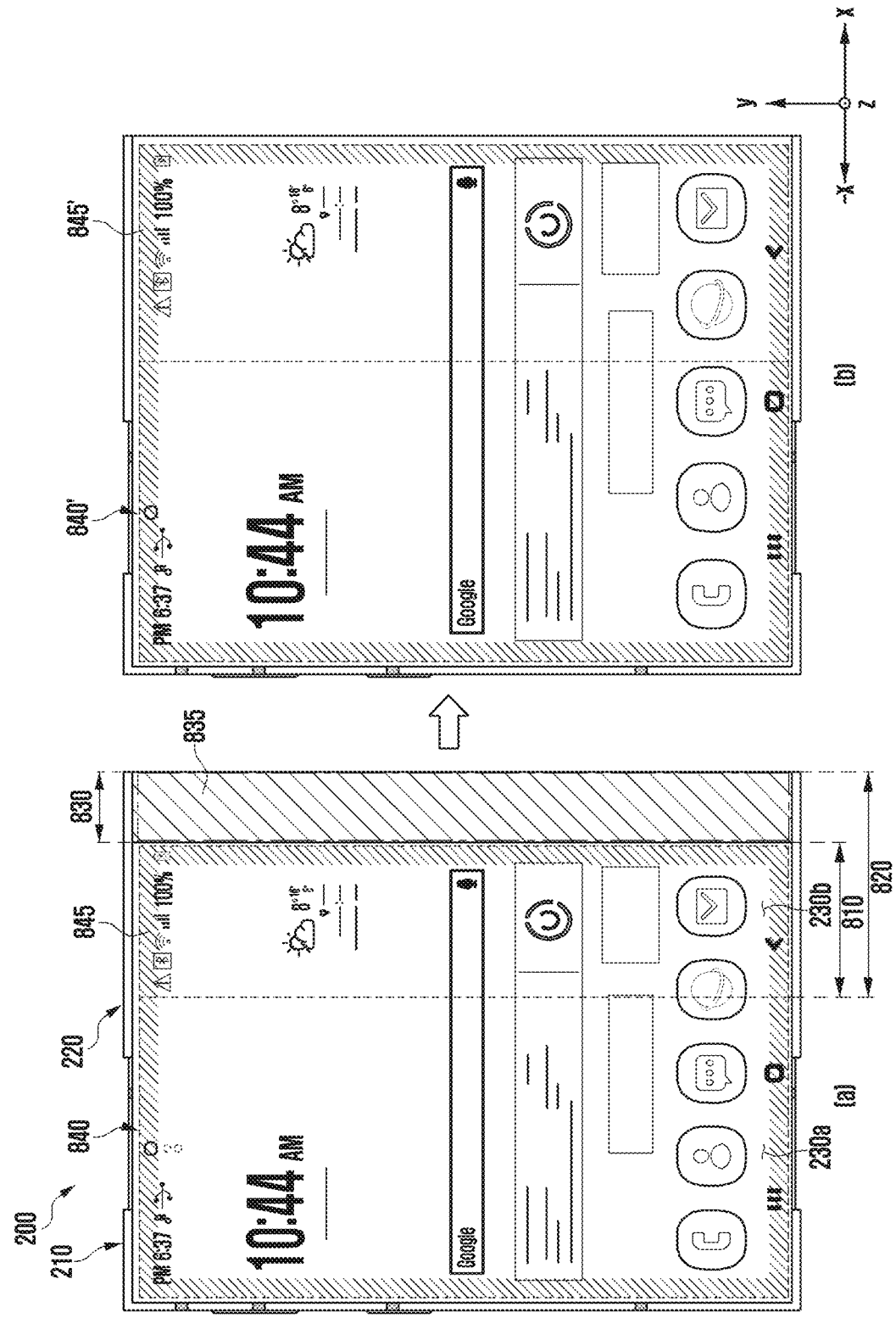
FIG. 8A is a diagram illustrating a first example in which a flexible display is changed in size according to various embodiments.

FIG. 8A is a diagram illustrating a first example in which a flexible display is changed in size according to various embodiments.

Figure 8B:
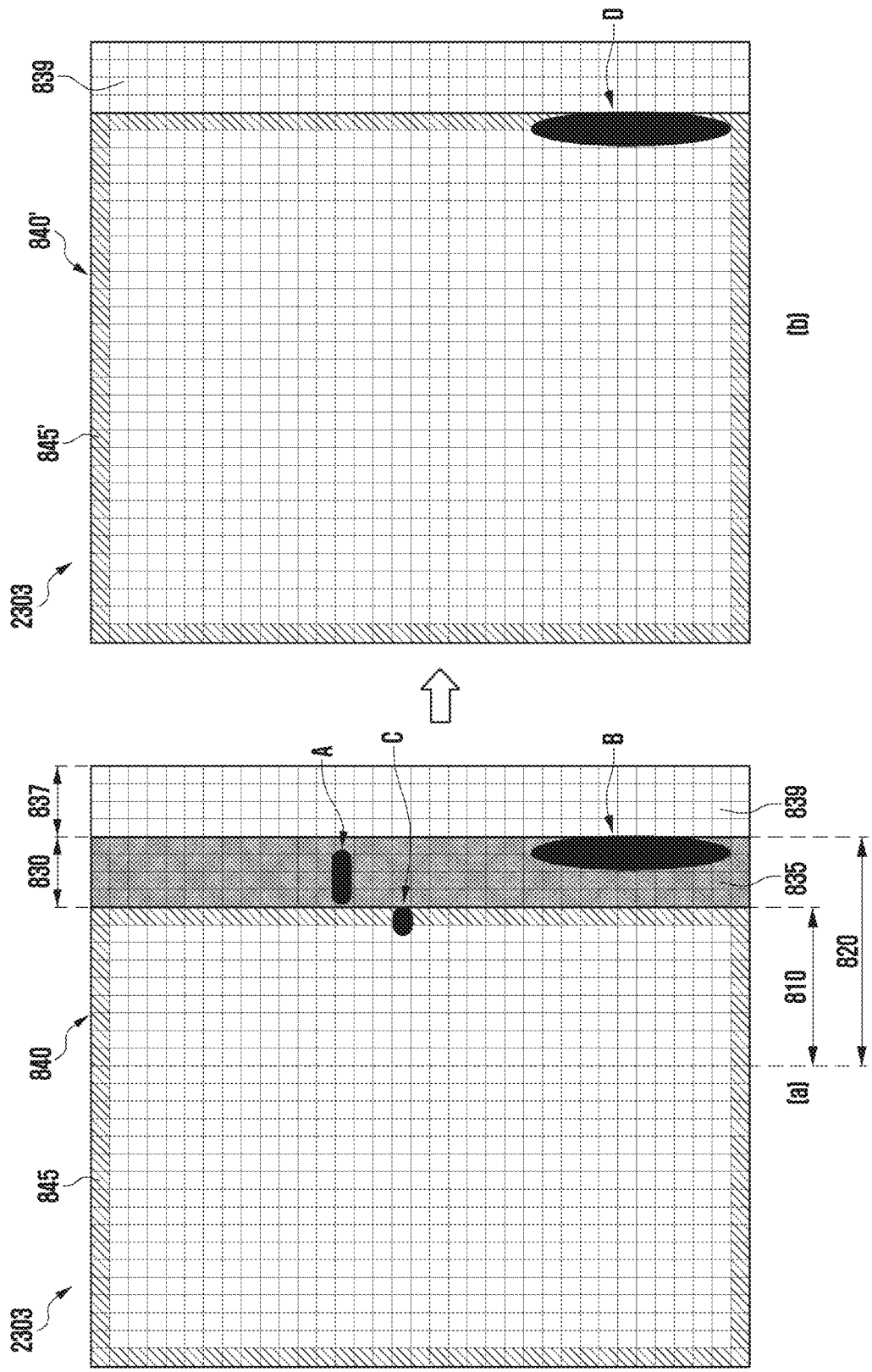
FIG. 8B is a diagram illustrating a touch panel in the first example according to various embodiments.

FIG. 8B is a diagram illustrating a touch panel in the first example according to various embodiments.

An electronic device 200 of FIG. 8A may be similar at least in part to the electronic device 101 of FIG. 1 or may further include other embodiments of the electronic device. FIG. 8A illustrates an example of an intermediate state in which a second housing (e.g., the second housing 220 in FIG. 2A) of the electronic device 200 partially slides out to the outside. The embodiment of the disclosure, however, is not limited to this example and may be applied to even a state in which the second housing 220 of the electronic device 200 fully slides out.

Part (a) of FIG. 8A illustrates that when the state of the electronic device 200 is changed (e.g., when at least a portion of the flexible display 230 slides in from the slide-out state to the intermediate state or slides out from the slide-in state to the intermediate state), an error distance 830 may occur between a first distance 810 that is a moving distance of a housing (e.g., the second housing 220 in FIG. 2A) measured by a sensor and a second distance 820 that is an actual moving distance of the housing. In this case, although an error region 835 is recognized as a slide-in region by a processor (e.g., the processor 760 in FIG. 7), in reality the housing 220 is exposed to the outside. Part (b) of FIG. 8A shows that a display region is adjusted according to various embodiments of the disclosure. For example, part (b) of FIG. 8A illustrates a state in which the display region is adjusted based on the second distance 820 that the housing 220 actually moves.

With reference to parts (a) and (b) of FIG. 8A, the electronic device 200 may include a first housing 210 (e.g., a first housing structure or a base housing), a second housing 220 (e.g., a second housing structure or a slide housing) movably combined within the maximum movable distance in a designated first direction (e.g., the x-axis direction) from the first housing 210, and a flexible display 230 (e.g., an expandable display, the display device 701 in FIG. 7) disposed to be supported through at least a portion of the first and second housings 210 and 220.

According to an embodiment, in the slide-in state or the intermediate state, at least a portion (e.g., a second portion 230b, a bendable portion) of the flexible display 230 may be disposed to be invisible from the outside by being accommodated in an inner space (e.g., the second space 2201 in FIG. 5) of the second housing 220. For example, in the slide-in state of the electronic device 200, a first portion 230a of the flexible display 230 may be exposed to be visible from the outside. In the slide-out state or the intermediate state of the electronic device 200, the second portion 230b of the flexible display 230 may also be exposed at least in part to be visible from the outside.

According to an embodiment, the electronic device 200 may perform a sliding operation (e.g., from the slide-in state to the slide-out state) along the x-axis direction. For example, the sliding operation (or the rolling operation) may be referred to as an operation that the state of the electronic device 200 is changed. For example, in response to the sliding operation of the electronic device 200, the area of the display region of the flexible display 230 may be changed in the intermediate state. In another example, the sliding operation may include an operation that the state of the electronic device 200 is changed such that the flexible display 230 changes from the slide-out state to the intermediate state or the slide-in state or changes from the slide-in state to the intermediate state or the slide-out state.

The electronic device 200 shown in parts (a) and (b) of FIG. 8A may include a state in which the flexible display 230 is at least partially expanded along the x-axis direction in response to the sliding operation. The electronic device 200 may include the first housing 210 and the second housing 220, and the second housing 220 may move at least in part along the x-axis direction in response to the sliding operation. According to an embodiment, the electronic device 200 may include a distance sensor (e.g., the sensor module 176 in FIG. 1) for detecting the sliding operation (or the rolling operation). For example, the distance sensor may include a Hall sensor. In addition, the distance sensor may be implemented in various types and may perform a function of detecting the sliding operation of the electronic device 200 and a function of measuring a sliding distance resulting from the sliding operation.

According to an embodiment, the processor (e.g., the processor 120 in FIG. 1, the processor 760 in FIG. 7) of the electronic device 200 may measure, using the distance sensor, the first distance 810 moved by the housing 220 of the electronic device 200. The electronic device 200 (e.g., the processor 760) may determine the display region of the flexible display 230 as a display region 840 shown in part (a) of FIG. 8A, based on moving distance information received from the distance sensor. For example, exposed areas of the first portion 230a and the second portion 230b based on the first distance 810 may be determined as the display region 840. The display region 840 may be configured with a logical coordinate range (e.g., X.Y(0.0) to X.Y(100.150)) or a boundary coordinate value (e.g., X.Y(100.150)) indicating the end of the display region, but there is no limitation. The logical coordinates may be a coordinate system used for displaying the GUI on the flexible display 230.

According to an embodiment, the display panel (e.g., the display panel 2304 in FIG. 6) and the touch panel (e.g., the touch panel 2303 in FIG. 6) included in the electronic device 200 may be configured with physical coordinates. For example, by the display control circuit (e.g., the display control circuit 722 in FIG. 7) and/or the sensor control circuit (e.g., the sensor control circuit 721 in FIG. 7), the physical coordinates may be configured based on wiring or electrical components on the display panel 2304 and the touch panel 2303. The coordinates configured on the display panel 2304 and the touch panel 2303 may be identical to or different from each other. When the two panels are different in the coordinate configuration, at least one of the sensor control circuit (e.g., the sensor control circuit 721 in FIG. 7), the display control circuit (e.g., the display control circuit 722 in FIG. 7), and/or the processor (e.g., the processor 120 in FIG. 1, the processor 760 in FIG. 7) may perform mapping of different physical coordinate configurations. For example, the touch panel 2303 may have a higher density of coordinates than the display panel 2304. For example, when the touch panel 2303 has a coordinate density three times higher than that of the display panel 2304, three points of physical coordinates of the touch panel 2303 may be mapped to one point of physical coordinates of the display panel 2304.

According to an embodiment, the electronic device 200 (e.g., the display control circuit 722, the processor 760) may perform mapping of physical coordinates and logical coordinates. According to an embodiment, the physical coordinates and the logical coordinates may be identical to each other. In this case, the coordinate mapping operation may be omitted. Hereinafter, for convenience of description, it is assumed that logical coordinates and the physical coordinates are used identically.

According to an embodiment, the coordinate information (e.g., a coordinate range, a coordinate value) of the determined display region 840 may be shared with the processor 760 and the control circuit 720 of the display device 701. For example, when the coordinate information of the display region 840 is determined by the processor 760, the processor 760 may transmit the coordinate information to the display control circuit 722 and/or the sensor control circuit 721, and the display control circuit 722 and/or the sensor control circuit 721 may use it for screen display and/or touch sensing. For example, the display control circuit 722 may activate a region of the display panel 2304 corresponding to the display region 840.

According to an embodiment, the electronic device 200 (e.g., the processor 760) may determine an edge region 845, based on the determined display region 840 (or based on the first distance 810). For example, the electronic device 200 may determine at least one edge of the display region 840 as the edge region 845. For example, at least a portion of the edge region 845 may be included in the display region 840. For example, only one edge that varies in response to a change in the state of the electronic device 200 may be included as the edge region 845, or such a variable edge and an edge parallel thereto may be included as the edge region 845. Hereinafter, for convenience, it will be described that all edges of the display region 840 are determined as the edge region 845. The electronic device 200 may determine a specified length from the outermost edge of the display region 840 as the edge region. For example, the specified length may be configured in units of length (e.g., millimeters), pixels of the screen (e.g., 3 pixels), or a coordinate range, but there is no limitation. Hereinafter, for convenience of description, it is assumed that the edge region 845 is configured with coordinate information (e.g., a coordinate range, a coordinate value).

According to an embodiment, the coordinate information of the determined edge region 845 may be shared with the processor 760 and the control circuit 720 of the display device 701. For example, when the coordinate information of the display region 840 is determined by the processor 760, the processor 760 may transmit the coordinate information to the display control circuit 722 and/or the sensor control circuit 721, and the display control circuit 722 and/or the sensor control circuit 721 may use it for screen display and/or touch sensing. For example, the sensor control circuit 721 may ignore a touch input of a designated type (e.g., a palm touch) among touch inputs entered to a region corresponding to the edge region 845 from the touch sensor 711 included in the touch panel 2303. In addition, the sensor control circuit 721 may notify (e.g., transmit an event) of a designated type of touch input entered to a region other than the edge region 845 to the processor 760. A detailed example thereof will be described in greater detail below with reference to FIG. 8B.

According to an embodiment, when the sliding operation occurs, the second distance 820 actually moved by the housing 220 may be different from the first distance 810 measured using the distance sensor. For example, the second distance 820 may be a distance actually (e.g., physically) moved by the flexible display 230. The first distance 810 and the second distance 820 may have a difference by the error distance 830. The electronic device 200 (e.g., the processor 120 in FIG. 1 or the processor 760 in FIG. 7) may not recognize the second distance 820 because of determining the moving distance based on the distance sensor. The electronic device 200 (e.g., the display control circuit 722) may activate the recognized display region 840, based on the first distance 810. Therefore, as shown in part (a) of FIG. 8A, the display panel 2404 is not activated in the error region 835 corresponding to the error distance 830, and the electronic device 200 may not display anything in the error region 835 even through the error region is actually exposed to the outside.

According to an embodiment, the electronic device 200 (e.g., the processor 760) may adjust the display region 840, based on at least one of the edge region 845 and the error region 835. For example, when a specified type of touch input (e.g., a palm touch) is received in a region (e.g., the error region 830) that does not overlap with the edge region 845, the electronic device 200 may determine that the actual moving distance is different from the sensed first distance 810. Based on at least one touch input entered to the error region 830, the electronic device 200 may estimate the error distance 830 and/or the end position of the actually exposed region of the flexible display 230. A related embodiment will be described in detail with reference to FIG. 8B.

According to an embodiment, based on the error distance 830 and/or the end position of the actually exposed region, the electronic device 200 may change the display region 840 to an adjusted display region 840' as shown in part (b) of FIG. 8A. For example, based on the estimated end coordinate value of the error region 835, the coordinate information of the adjusted display region 840' may be determined. Therefore, an activated region of the display panel 2404 may be changed based on the adjusted display region 840', and the GUI may be displayed in an area (e.g., the display region 840' adjusted based on the error region 835) that is substantially identical or similar to the exposed area of the flexible display 230.

Part (a) of FIG. 8B shows a touch panel (e.g., the touch panel 2303 in FIG. 6) corresponding to the state of the electronic device 200 shown in part (a) of FIG. 8A. In addition, part (b) of FIG. 8B shows the touch panel (e.g., the touch panel 2303 in FIG. 6) corresponding to the state of the electronic device 200 shown in part (b) of FIG. 8A.

With reference to part (a) of FIG. 8B, the touch panel 2303 may have an edge region 845, an error region 835, and/or an actual slide-in region 839. For example, the edge region 845 may include a region corresponding to the edge region 845 of the display panel 2404 configured by the electronic device 200 based on the first distance 810. The sensor control circuit (e.g., the sensor control circuit 721 in FIG. 7) may configure the edge region 845 by receiving coordinate information corresponding to the edge region 845 from the processor 760 or the display control circuit (e.g., the display control circuit 722 in FIG. 7). According to an example, the edge region of the touch panel 2303 may be configured separately from the edge region 845 of the display panel (e.g., the display panel 2304 in FIG. 6), but the same reference numeral is used for convenience of description, which is applied to other regions as well. According to an example, the error region 835 and the actual slide-in region 839 are divided for explanation, and the sensor control circuit 721 may not be able to distinguish them. For example, the sensor control circuit 721 may recognize both the error region 835 and the actual slide-in region 839 as a region that slides in into the electronic device 200.

According to an embodiment, the touch panel 2303 may be in an activated state as a whole. Therefore, the electronic device 200 may detect a touch input even in the error region 835 and the actual slide-in region 839 of the touch panel 2303 corresponding to the non-activated region of the display panel 2304. For example, the touch panel 2303 may activate the whole (e.g., all of a plurality of electrodes) of the touch sensor (e.g., the touch sensor 711 in FIG. 7) included in the touch panel 2303 or may set the activation degree of the touch sensor 711 differently for each region. For example, in the error region 835 and the actual slide-in region 839 that the processor 760 recognizes as the slide-in region, some of the electrodes contained in the touch sensor 711 may be deactivated or operated in a power management mode.

According to an embodiment, the electronic device 200 may detect a touch input to the touch panel 2303 using the sensor control circuit (e.g., the sensor control circuit 721 in FIG. 7). The sensor control circuit 721 may identify a value related to characteristics (e.g., at least one of a touch position (coordinates), a touch area, a touch sensitivity, a touch drag distance, and/or a touch hold time) associated with a touch and a value related to characteristics (e.g., pressure sensitivity) associated with pressure. The sensor control circuit 721 may process the detected touch input, based at least in part on the identified touch-associated characteristics.

According to an embodiment, the electronic device 200 (e.g., the sensor control circuit 721) may determine whether an input touch is included in a specified type of touch. For example, the specified type of touch may refer to a touch input defined to ignore its processing when a touch position overlaps with the edge region 845 by a designated area or more. For example, for the specified type of touch, at least one of a touch pattern, a touch shape, a touch area, and/or a touch pressure may be designated. For example, at least one of a pattern, shape, area, and/or pressure of a touch (hereinafter, referred to as 'palm touch' for convenience) detected by the touch panel 2303 when the user grips the electronic device 200 may correspond to the specified type of touch. For example, the edge region 845 is highly likely to be gripped by the user, and unless ignoring the processing of the palm touch entered to the touch panel 2303 when the user grips, the electronic device 200 may wrongly operate. Therefore, the electronic device 200 (e.g., the sensor control circuit 721) may be configured to ignore a touch input related to grip generated in the edge region 845. For example, the operation of ignoring the touch input may refer, for example, to the sensor control circuit 721 not transmitting the touch input event to the processor 760. In another example, the operation of ignoring the touch input may refer, for example, to even if the sensor control circuit 721 transmits the touch input event to the processor 760, at least one of programs (e.g., an application, an operating system, a middleware) executed by the processor 760 not performing an operation corresponding to the received touch input event. In various embodiments of the disclosure, it is assumed for convenience of description that the specified type of touch is a palm touch, but this is only an example. For example, a drag touch and/or a touch input may be included in the specified type of touch, or all types of touch may be included in the specified type of touch. The electronic device 200 may ignore all types of touch inputs entered to the edge region 845.

According to an embodiment, the electronic device 200 (e.g., the sensor control circuit 721) may detect a touch A to a touch C shown in part (a) of FIG. 8B. The sensor control circuit 721 may determine that the touch A and the touch B are touches generated in a region that does not overlap with the edge region 845, and also determine that the touch A is a drag touch and the touch B is a palm touch. The electronic device 200 (e.g., the sensor control circuit 721) may determine the touch C as a normal touch that is a touch in which the area overlapped with the edge region 845 is greater than a specified size (e.g., 50% or more). Because the touch C overlapped with the edge region 845 is not the specified type of touch, the electronic device 200 may process the touch C. For example, the sensor control circuit 721 may transmit a touch event for the touch C to the processor 760.

According to an embodiment, the electronic device 200 (e.g., at least one of the sensor control circuit 721, the display control circuit 722, and the processor 760) may change at least a portion of the display region 840 and/or the edge region 845, based on the touch B which is the specified type of touch detected in a region that does not overlap with the edge region 845. For example, when a palm touch occurs in a region that does not overlap with the edge region 845, it may refer, for example, to the configuration of the edge region 845 being incorrect. The electronic device 200 may determine an outermost point of the touch B. For example, the outermost point of the touch B may be a substantial end point of an exposed region of the display panel 2304. For example, the electronic device 200 may determine the x-coordinate of the end point of the sliding direction in the x-axis direction (e.g., the x-axis direction in FIG. 2B) and determine it as the x-coordinate of the display region 840. As the display region 840 is determined, the electronic device 200 may change the edge region 845. According to an embodiment, the sensor control circuit 721 may determine the outermost point of the touch B and transmit it to the processor 760. Alternatively, the sensor control circuit 721 may transmit a touch event and touch information related to the touch B to the processor 760, and the processor 760 may determine the outermost point of the touch B.

According to an embodiment, the electronic device 200 may determine the error distance 830. For example, the error distance 830 may be determined using a difference between the estimated end point of the exposed region and the outermost position (e.g., the outermost position in the sliding direction) of the display region 840 and/or the edge region 845.

According to an embodiment, if a specified type of touch occurs more than a predetermined number of times (e.g., 10 times) and/or continues for a predetermined time (e.g., 30 seconds) or more in a region that does not overlap with the edge region 845, the electronic device 200 may determine an end coordinate in the x-axis direction among a plurality of palm touches and, based on this, change the display region 840 and/or the edge region 845.

According to an embodiment, the electronic device 200 (e.g., the sensor control circuit 721) may not include, in the specified type of touch, the touch A generated in the region that does not overlap with the edge region 845. For example, the electronic device 200 may process the touch A as a drag touch. For example, the sensor control circuit 721 may transmit a drag touch input event to the processor 760. When a touch event occurs outside the display region 840, the processor 760 may ignore the event for the touch A or use at least in part the touch A in changing the display region 840.

According to an embodiment, the electronic device 200 (e.g., the sensor control circuit 721) may change an activation level of the touch sensor 711, based on whether a touch input occurs in a region that does not overlap with the edge region 845. For example, the sensor control circuit 721 may recognize up to the edge region 845 as the exposed region of the flexible display 230, and deactivate (e.g., apply no power) or operate in a power management mode a part (e.g., some electrodes) of the touch sensor 711 in the error region 835 and the actual slide-in region 839 recognized as the slide-in region. In this case, when a touch input is detected through an activated part of the touch sensor 711, it is possible to activate the entire touch sensor 711 for precise touch recognition.

With reference to part (b) of FIG. 8B, the electronic device 200 (e.g., the sensor control circuit 721) may configure the changed edge region 845' in the touch panel 2303. The electronic device 200 may monitor whether a palm touch input is detected from the changed edge region 845'. For example, when a palm touch D is entered to overlap with the changed edge region 845' by a certain area or more, the electronic device 200 may complete the change of the display region 840 and/or the edge region 845. For example, at least a portion (e.g., some of a plurality of electrodes) of the touch sensor 711 corresponding to the actual slide-in region 839 may be deactivated or operated in a power management mode. In addition, if the specified type of touch (e.g., the touch D) is detected to overlap with the changed edge region 845' by a certain area or more, processing for this may be ignored.

FIG. 9A is a diagram illustrating a second example in which a flexible display is changed in size according to various embodiments.

Figure 9B:
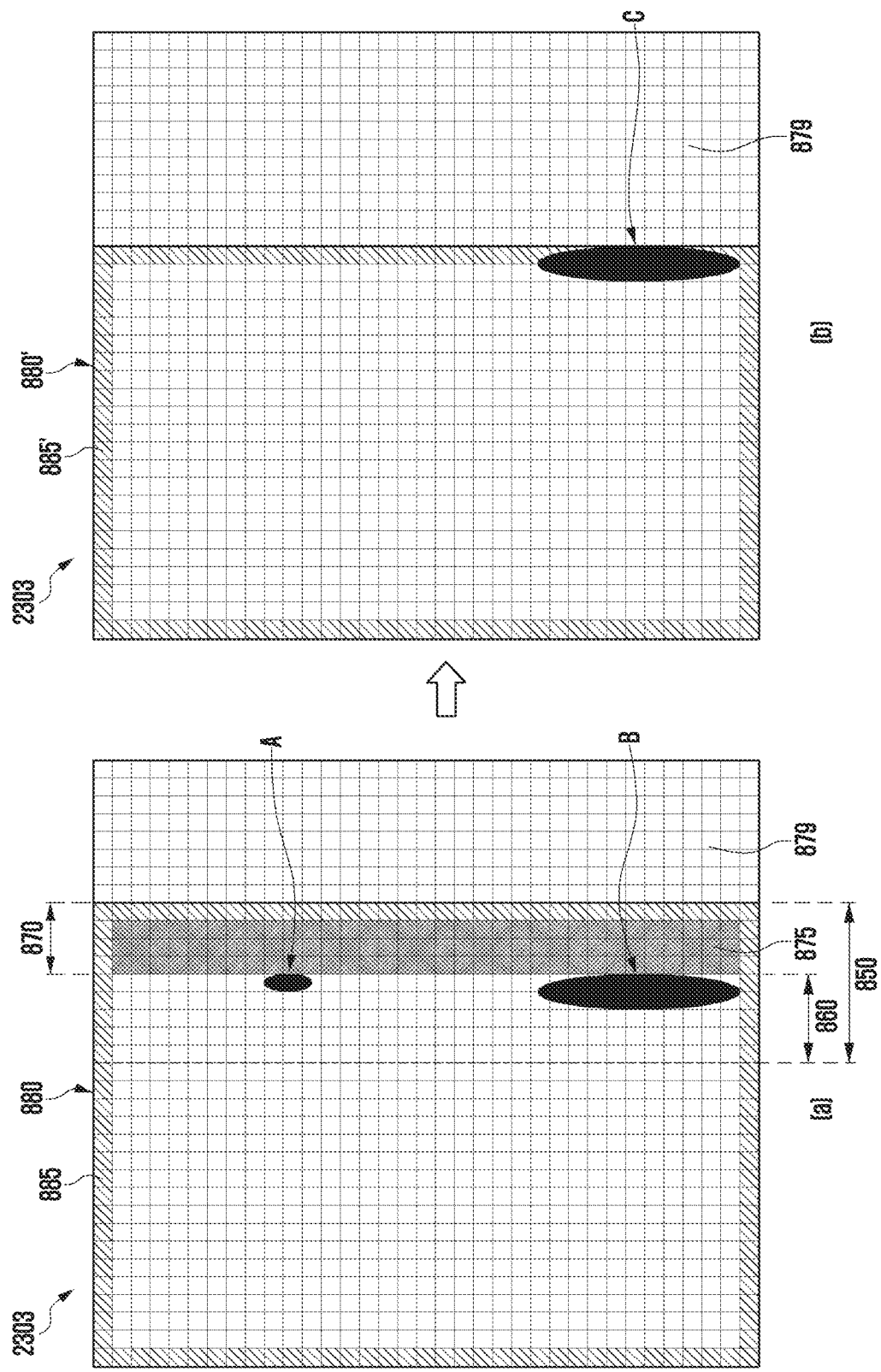
FIG. 9B is a diagram illustrating a touch panel in the second example according to various embodiments.

FIG. 9B is a diagram illustrating a touch panel in the second example according to various embodiments.

An electronic device 200 of FIG. 9A may be similar at least in part to the electronic device 101 of FIG. 1 or may further include other embodiments of the electronic device. FIG. 9A illustrates an example of an intermediate state in which a second housing (e.g., the second housing 220 in FIG. 2A) of the electronic device 200 partially slides out to the outside. The embodiment of the disclosure, however, is not limited to this example and may be applied to even a state in which the second housing 220 of the electronic device 200 fully slides out.

Part (a) of FIG. 9A shows that when the state of the electronic device 200 is changed, an error distance 870 may occur between a first distance 850 that is a moving distance of a housing (e.g., the second housing 220 in FIG. 2A) measured by a sensor and a second distance 860 that is an actual moving distance of the housing. In this case, although an error region 875 is recognized as an exposed region by a processor (e.g., the processor 760 in FIG. 7), in reality it is in a slide-in state inside the electronic device 200. Part (b) of FIG. 9A shows that a display region is adjusted based on the second distance 860 that the housing 220 actually moves, according to various embodiments of the disclosure.

Hereinafter, a description overlapping with the above may not be repeated.

With reference to parts (a) and (b) of FIG. 9A, the electronic device 200 according to an embodiment may perform a sliding operation along the x-axis direction. For example, the sliding operation (or the rolling operation) may be referred to as an operation that the state of the electronic device 200 is changed.

The electronic device 200 shown in parts (a) and (b) of FIG. 9A may include a state in which the flexible display 230 is at least partially moved along the x-axis direction in response to the sliding operation. When the sliding operation occurs, the display region of the flexible display 230 may be at least partially expanded.

According to an embodiment, the electronic device 200 (e.g., the processor 120 in FIG. 1, the processor 760 in FIG. 7) may measure, using the distance sensor, the first distance 850 moved by the housing 220 of the electronic device. The electronic device 200 (e.g., the processor 760) may determine the display region of the flexible display 230 as a display region 880 shown in part (a) of FIG. 9A, based on moving distance information received from the distance sensor. For example, exposed areas of the first portion 230a and the second portion 230b based on the first distance 850 may be determined as the display region 880.

According to an embodiment, the coordinate information (e.g., a coordinate range, a coordinate value) of the determined display region 880 may be shared with the processor 760 and the control circuit 720 of the display device 701. For example, when the coordinate information of the display region 880 is determined by the processor 760, the processor 760 may transmit the coordinate information to the display control circuit 722 and/or the sensor control circuit 721, and the display control circuit 722 and/or the sensor control circuit 721 may use it for screen display and/or touch sensing. For example, the display control circuit 722 may activate a region of the display panel 2304 corresponding to the display region 880.

According to an embodiment, the electronic device 200 (e.g., the processor 760) may determine an edge region 885, based on the determined display region 880 (or based on the first distance 850). For example, the electronic device 200 may determine a specified length from the outermost edge of the display region 880 as the edge region.

According to an embodiment, the coordinate information of the determined edge region 885 may be shared with the processor 760 and the control circuit 720 of the display device 701. For example, when the coordinate information of the display region 880 is determined by the processor 760, the processor 760 may transmit the coordinate information to the display control circuit 722 and/or the sensor control circuit 721, and the display control circuit 722 and/or the sensor control circuit 721 may use it for screen display and/or touch sensing. For example, the sensor control circuit 721 may ignore a touch input of a designated type among touch inputs entered to a region corresponding to the edge region 885 from the touch sensor 711 included in the touch panel 2303. In addition, the sensor control circuit 721 may notify (e.g., transmit an event) of a designated type of touch input entered to a region other than the edge region 885 to the processor 760. A detailed embodiment thereof will be described in greater detail below with reference to FIG. 9B.

According to an embodiment, when the sliding operation occurs, the second distance 860 actually moved by the housing 220 may be different from the first distance 850 measured using the distance sensor. For example, the first distance 850 and the second distance 860 may have a difference by the error distance 870. The electronic device 200 may not recognize the second distance 860 because of determining the moving distance based on the distance sensor. The electronic device 200 (e.g., the display control circuit 722) may activate the recognized display region 880. Therefore, as shown in part (a) of FIG. 9A, even though the display panel 2404 displays the screen in the error region 875 corresponding to the error distance 870, the error region 875 is really in a slide-in state inside the electronic device 200 and may not be shown to the user.

According to an embodiment, the electronic device 200 (e.g., the processor 760) may adjust the display region 880, based on at least one of the edge region 885 and the error region 875. For example, when a specified type of touch input (e.g., a palm touch) is received from the outside (e.g., the error region 875) of the edge region 885, the electronic device 200 may determine that the actual moving distance is different from the sensed first distance 850. Based on at least one touch input detected from the outside of the error region 885, the electronic device 200 may estimate the error distance 870 and/or the end position of the actually exposed region of the flexible display 230. Alternatively, the electronic device 200 may determine the error distance 870 and/or the error region 875, further based on the fact that there is no touch input for a certain time in the error region 880. A related embodiment will be described in detail with reference to FIG. 9B.

According to an embodiment, based on the error distance 870 and/or the end position of the actually exposed region, the electronic device 200 may change the display region to an adjusted display region 880' as shown in part (b) of FIG. 9A. For example, based on the estimated end coordinate value of the error region 875, the coordinate information of the adjusted display region 880' may be determined. Therefore, an activated region of the display panel 2404 may be changed based on the adjusted display region 880', and the GUI may be displayed in an area (e.g., the display region 880' adjusted based on the error region 875) that is substantially identical or similar to the exposed area of the flexible display 230.

Part (a) of FIG. 9B shows a touch panel (e.g., the touch panel 2303 in FIG. 6) corresponding to the state of the electronic device 200 shown in part (a) of FIG. 9A. In addition, part (b) of FIG. 9B shows the touch panel (e.g., the touch panel 2303 in FIG. 6) corresponding to the state of the electronic device 200 shown in part (b) of FIG. 9A.

With reference to part (a) of FIG. 9B, the touch panel 2303 may have an edge region 885, an error region 875, and/or an actual slide-in region 879. For example, the edge region 885 may include a region corresponding to the edge region 885 of the display panel (e.g., the display panel 2404 in FIG. 6) configured by the electronic device 200 based on the first distance 850. According to an example, the error region 875 and the actual slide-in region 879 are divided for explanation, and the sensor control circuit 721 may not be able to distinguish them. For example, the sensor control circuit 721 may recognize that the error region 875 is included in the inside (e.g., the display region 880) of the edge region 885 and thereby exposed to the outside of the housing 220, and may recognize only the remaining region excluding the error region 875 from the actual slide-in region 879 as the slide-in region.

According to an embodiment, the touch panel 2303 may be in an activated state as a whole.

According to an embodiment, the electronic device 200 may detect a touch input to the touch panel 2303 using the sensor control circuit (e.g., the sensor control circuit 721 in FIG. 7). The sensor control circuit 721 may process the detected touch input, based at least in part on identified touch-associated characteristics.

According to an embodiment, the electronic device 200 (e.g., the sensor control circuit 721) may determine whether an input touch is included in a specified type of touch.

According to an embodiment, the electronic device 200 (e.g., the sensor control circuit 721) may detect a touch A and a touch B shown in part (a) of FIG. 9B. The sensor control circuit 721 may determine that the touch A and the touch B are touches that do not overlap with the edge region 885, and also determine that the touch A is a normal touch and the touch B is a palm touch. Because the touch A is not the specified type of touch, the electronic device 200 may process the touch A. For example, the sensor control circuit 721 may transmit a touch event for the touch A to the processor 760.

According to an embodiment, the electronic device 200 (e.g., at least one of the sensor control circuit 721, the display control circuit 722, and the processor 760) may change at least a portion of the display region 880 and/or the edge region 885, based on the touch B which is the specified type of touch detected in a region that does not overlap with the edge region 885. For example, the electronic device 200 may determine an outermost point (e.g., a coordinate value) of the touch B. For example, the outermost point of the touch B may be a substantial end point of an exposed region of the display panel 2304. The electronic device 200 may change the display region 880, based on the determined outermost point, and thus change the edge region 885.

According to an embodiment, the electronic device 200 may determine the error distance 870. For example, the error distance 870 may be determined using a difference between the estimated end point of the exposed region and the outermost position (e.g., the outermost position in the sliding direction) of the display region 880 and/or the edge region 885.

According to an embodiment, if a specified type of touch occurs more than a predetermined number of times (e.g., 10 times) and/or continues for a predetermined time (e.g., 30 seconds) or more in a region that does not overlap with the edge region 885, the electronic device 200 may determine an end coordinate in the x-axis direction among a plurality of palm touches and, based on this, change the display region 880 and/or the edge region 885.

According to an embodiment, the electronic device 200 (e.g., the sensor control circuit 721) may change an activation level of the touch sensor 711, based on whether a touch input occurs in a region that does not overlap with the edge region 885. For example, the sensor control circuit 721 may recognize up to the edge region 885 as the exposed region of the flexible display 230, and deactivate (e.g., apply no power) or operate in a power management mode a part (e.g., some electrodes) of the touch sensor 711 in the region recognized as the slide-in region. In this case, when a touch input is detected through at least activated part of the touch sensor 711, it is possible to activate the entire touch sensor 711 for precise touch recognition.

With reference to part (b) of FIG. 9B, the electronic device 200 (e.g., the sensor control circuit 721) may configure the changed edge region 885' in the touch panel 2303. The electronic device 200 may monitor whether a palm touch input is detected from the changed edge region 885'. For example, when a palm touch C is entered to overlap with the edge region 885' by a certain area or more, the electronic device 200 may complete the change of the display region 880 and/or the edge region 885. In addition, the electronic device 200 may ignore the touch C, which is the specified type of touch overlapping with the edge region 885' by a certain area or more.

Figure 10:
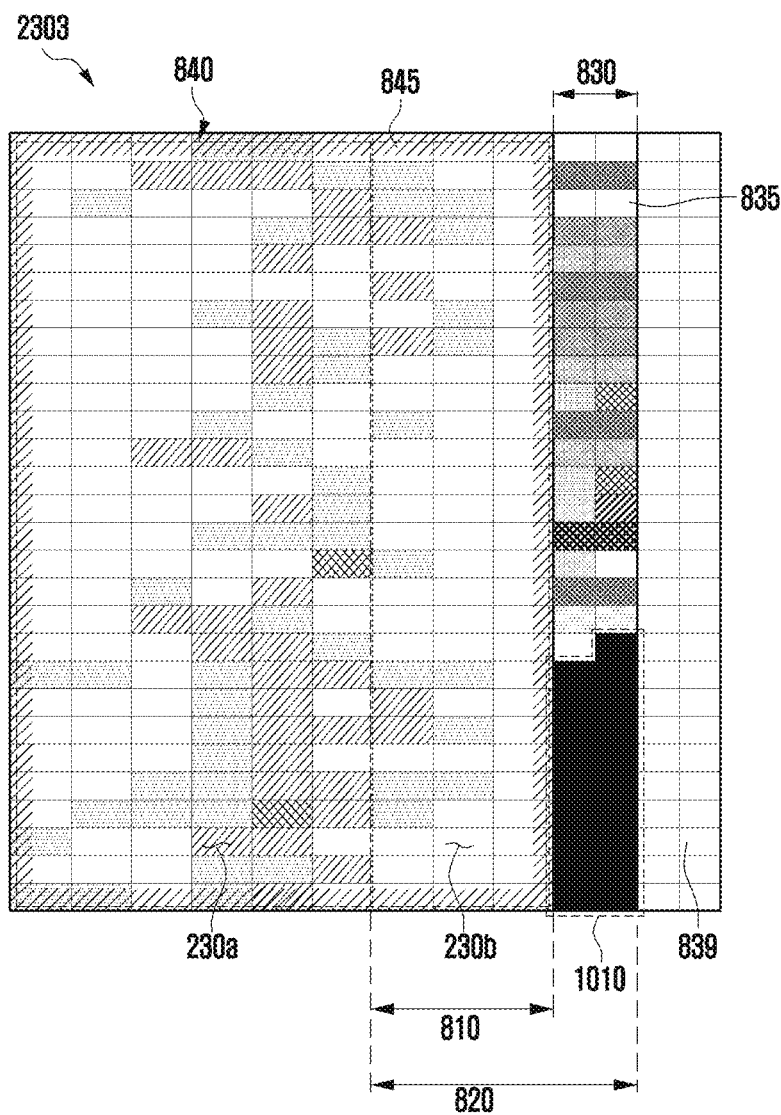
FIG. 10 is a diagram illustrating an example process of identifying coordinates by a touch event in an edge region based on a touch panel according to various embodiments.

FIG. 10 is a diagram illustrating an example process of identifying coordinates by a touch event in an edge region based on a touch panel according to various embodiments. FIG. 10 shows the touch panel (e.g., the touch panel 2303 in FIG. 6) shown in part (a) of FIG. 8B.

With reference to FIG. 10, the touch panel 2303 may include a display region 840, an error region 835, and an actual slide-in region 839. For example, the display region 840 may include an edge region 845 that is configured at least in part to correspond to the outermost part. The electronic device 200 may be in a state where a housing (e.g., the second housing 220 in FIG. 2A) is at least partially moved in response to the sliding operation, and FIG. 10 shows the state of the touch panel 2303 resulting from the sliding operation.

According to an embodiment, the electronic device 200 may identify a first distance 810 resulting from the sliding operation and, based on the first distance 810, determine the display region 840. For example, the first distance 810 is a sensing value measured using a distance sensor, and the electronic device 200 may recognize that the touch panel 2303 is exposed to the outside by the first distance 810. According to an embodiment, by the sliding operation, the electronic device 200 may be in a state where actually the housing 220 is physically moved by a second distance 820. For example, the touch panel 2303 may be substantially extended by the second distance 820 and may be in a state of being additionally exposed to the outside by the error region 835 corresponding to an error distance 830.

According to an embodiment, the electronic device 200 may detect a user's touch input 1010, based on the error region 835 other than the display region 840 of the flexible display (e.g., the flexible display 230 in FIG. 2A). For example, when the user's touch input 1010 is detected in the error region 835, the electronic device 200 may identify that the touch panel 2303 is extended by the error distance 830 more than the first distance 810 measured using the distance sensor. According to an embodiment, the electronic device 200 may detect the input touch input 1010 based on the error region 835 and identify the type of touch input (e.g., a palm touch, a normal touch, a one touch, a double touch) based on coordinate information of the detected touch input 1010.

According to an embodiment, the electronic device 200 may identify the second distance 820 to which the touch panel 2303 is actually physically extended, based on the coordinate information of the touch input, and adjust the display region 840 and the edge region 845, based on the identified second distance 820. According to an embodiment, the electronic device 200 may adjust display region 840 and the edge region 845, based on the first distance 810 measured using the distance sensor and the second distance 820 identified based on the coordinate information of the touch input.

According to an embodiment, a processor (e.g., the processor 120 in FIG. 1) of the electronic device 200 may accumulate touch event information, based on the touch panel 2303 formed in response to the measured second distance 820. For example, the processor 120 may activate at least in part the touch panel 2303 and detect a touch event. When the flexible display 230 physically moves by the second distance 820, the processor 120 may construct the detected touch event information in the form of a table and store it in a memory (e.g., the memory 130 in FIG. 1). According to an embodiment, using the accumulated touch event information, the processor 120 may identify the error region 835 in which the flexible display 230 is actually expanded, and may quickly perform a correction function of the screen display region (e.g., a function of correcting the display region 840 and the edge region 845) for the flexible display 230.

According to various example embodiments, an electronic device may include a flexible display having a first portion disposed to be visible from an outside and a second portion extending from the first portion and accommodated in an inner space to be invisible from the outside in a slide-in state; a housing having a variable size wherein the flexible display is configured to be expanded in response to a change from the slide-in state to a slide-out state; a sensor (e.g., a distance sensor, the sensor module 176 in FIG. 1) disposed in the inner space and configured to detect a moving distance of the flexible display; a memory; and a processor operatively connected to the flexible display, the sensor, and the memory. The processor may be configured to: identify a first distance for the flexible display through the sensor in response to the change from the slide-in state to the slide-out state, control the display to display a user interface through the flexible display based on the first distance, detect a touch on at least a partial region of the flexible display, identify a second distance for the flexible display based on coordinate information corresponding to the detected touch, adjust a size or position of the user interface based on a difference value between the first distance and the second distance, and control the display to display the adjusted user interface through the flexible display.

According to an example embodiment, the processor may be further configured to: determine a first user interface based on the first distance, and adjust a size of the first user interface by applying a correction value based on the difference value between the first distance and the second distance.

According to an example embodiment, the processor may be further configured to: apply the correction value to the first user interface based on the second distance, and determine a second user interface corresponding to the second distance.

According to an example embodiment, the processor may be further configured to: determine whether the difference value between the first distance and the second distance exceeds a threshold value, and adjust the size of the user interface based on the difference value exceeding the threshold value.

According to an example embodiment, the flexible display may include a touchscreen panel configured to maintain an activated state, and the processor may be further configured to detect the touch event through the touchscreen panel.

According to an example embodiment, the processor may be further configured to: identify coordinate information corresponding to the touch event, construct a table by matching the first distance and the identified coordinate information, and identify the second distance for the flexible display based on the constructed table.

According to an example embodiment, the sensor may include a magnetic force sensor, and the processor may be further configured to: detect a change in magnetic force using the magnetic force sensor in response to the change from the slide-in state to the slide-out state, and identify the first distance for the flexible display based on the change in the magnetic force.

According to an example embodiment, the processor may be further configured to: identify an edge line of the flexible display in response to the change from the slide-in state to the slide-out state, configure, as an edge region, a region occupied by a specified length from the identified edge line, and detect occurrence of the touch event based on the configured edge region.

According to an example embodiment, the housing may include a first housing having a first space, a second housing combined to be slidable from the first housing along a first direction and having a second space, and a bendable support connected to the first housing, accommodated at least partially in the second space in the slide-in state, and being at least partially coplanar with the first housing in the slide-out state, and the flexible display may be configured to be expanded based on the second housing sliding along the first direction.

According to an example embodiment, the processor may be further configured to control the display to display notification information related to the correction value based on a range of applying the correction value being exceeded.

According to an example embodiment, the processor may be further configured to: control the display to display first guide information for identifying a first edge line of the flexible display in the slide-in state and determine the first edge line in response to an input for the first edge line, and control the display to display second guide information for identifying a second edge line of the flexible display in the slide-out state and determine the second edge line in response to an input for the second edge line.

According to an example embodiment, the processor may be further configured to: determine a first user interface based on the first edge line in the slide-in state, determine a second user interface based on the second edge line in the slide-out state, and adjust the first user interface to the second user interface in response to the change from the slide-in state to the slide-out state.

According to an example embodiment, the processor may be further configured to: identify a contact area of the touch event based on coordinate information corresponding to the touch event, and identify the second distance for the flexible display based on the contact area being greater than a given area.

Figure 11:
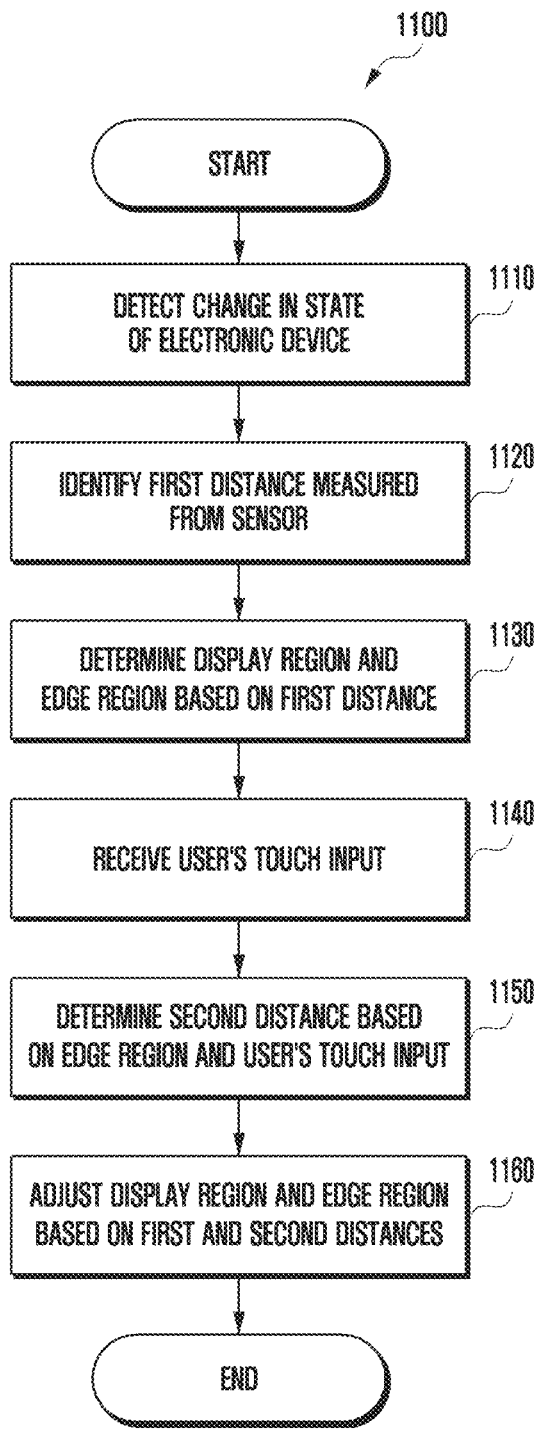
FIG. 11 is a flowchart illustrating an example method of adjusting a screen size based on a physically extended display region of a flexible display according to various embodiments.

FIG. 11 is a flowchart illustrating an example method of adjusting a screen size based on a physically extended display region of a flexible display according to various embodiments.

According to an embodiment, an electronic device (e.g., the electronic device 200 in FIG. 2A) may include a first housing (e.g., the first housing 210 in FIG. 2A), a second housing (e.g., the second housing 220 in FIG. 2A), and a flexible display (e.g., the flexible display 230 in FIG. 2A, the display device 701 in FIG. 7) disposed to be supported by at least a portion of the first and second housings 210 and 220. The electronic device 200 may operate in a slide-in state in which the second housing 220 is completely slid in into the electronic device 200, in a slide-out state in which the second housing 220 is completely slid out from the electronic device 200, and/or in an intermediate state between the slide-in state and the slide-out state. For example, the electronic device 200 may perform a sliding operation that the second housing 220 is slid in or out within a specified movable distance in a specified direction (e.g., the x-axis direction). According to an embodiment, the electronic device 200 in the slide-in state may be switched to the slide-out state in response to the sliding operation, and the electronic device 200 in the slide-out state may be switched to the slide-in state in response to the sliding operation. According to an embodiment, in the slide-in state of the electronic device 200, as the second housing 220 is at least partially accommodated in the inner space of the electronic device 200, a portion of the flexible display 230 disposed to correspond to the second housing 220 may not be visible from the outside. In the slide-out state of the electronic device 200, as the second housing 220 is exposed to the outside, a portion of the flexible display 230 disposed to correspond to the second housing 220 may be visible.

Hereinafter, in the detailed description of FIG. 11, a situation in which the electronic device 200 is changed from the slide-in state to the intermediate state and/or the slide-out state will be mainly described, but this is not a limitation.

According to various embodiments, the operations illustrated in FIG. 11 may be performed by at least one component (e.g., the control circuit 720 in FIG. 7, the processor 760 in FIG. 7) of the electronic device 200.

At operation 1110, a processor (e.g., the processor 120 in FIG. 1, the processor 760 in FIG. 7) of the electronic device 200 may detect a change in the state of the electronic device 200. For example, the processor 120 may detect a situation to change from the slide-in state to the intermediate state or the slide-out state, a situation to change from the slide-out state to the intermediate state or the slide-in state, and/or a situation to change from the intermediate state to the slide-in state or the slide-out state. For example, the processor 120 may detect a sliding motion (or a rolling motion) using a sensor.

At operation 1120, the processor 120 may identify a first distance (e.g., the first distance 810 in FIG. 8A) measured from a sensor (e.g., a distance sensor, the sensor module 176 in FIG. 1). For example, the electronic device 200 may change from the slide-in state to the intermediate state and/or the slide-out state, and as the second housing 220 moves at least partially, the display region of the flexible display 230 may be expanded. Using the distance sensor, the processor 120 may measure a distance (e.g., the first distance, a value measured through the sensor) moved by the second housing 220.

At operation 1130, the processor 120 may determine a display region (e.g., the display region 840 in FIG. 8A) and an edge region (e.g., the edge region 845 in FIG. 8A), based on the first distance. For example, the processor 120 may determine the display region based on the first distance and may determine the edge region based on the determined display region. For example, the processor 120 may determine at least one edge of the display region as the edge region. The edge region may be included at least in part in the display region. According to an embodiment, the processor 120 may determine an area of a specified length from the outermost edge of the display region as the edge region. According to an embodiment, based on the display region and/or the edge region, the processor 120 may activate at least in part the flexible display 230 to display at least one content or detect a user's touch input.

At operation 1140, the processor 120 may receive a user's touch input, based on the activated flexible display 230. For example, the processor 120 may receive at least one touch input (e.g., a touch event) of the user through a touch panel (e.g., the touch panel 2303 in FIG. 6) of the flexible display 230.

At operation 1150, the processor 120 may determine a second distance (e.g., an actual physically extended distance) (e.g., the second distance 820 in FIG. 8A), based on the edge region and the user's touch input. For example, the processor 120 may detect the user's touch input, based on the display region, the edge region, and an error region, and determine the second distance, based on the user's touch input to the edge region and the error region. For example, the flexible display 230 may be divided into the display region in which at least one content is displayed, the edge region corresponding to an area occupied by a specified length from the outermost edge of the display region, and/or the remaining region (e.g., an error region, the error region 835 in FIG. 8A) other than the display region and the edge region. According to an embodiment, the processor 120 may detect the user's touch input based on the activated flexible display 230 (e.g., the touch panel 2303 in FIG. 6) and determine the second distance based on the detected user's touch input. The second distance may include a moving distance in which the flexible display 230 is actually exposed to the outside resulting from the movement of the second housing 220.

At operation 1160, the processor 120 may adjust the display region and the edge region, based on the first distance (e.g., a moving distance measured using the distance sensor, the first distance 810 in FIG. 8A) and the second distance (e.g., a moving distance identified using coordinate information, the second distance 820 in FIG. 8A). For example, the processor 120 may determine the existence of the error region 835 based on the first distance measured using the distance sensor and the second distance identified using the coordinate information, and adjust the display region and the edge region based on the error region 835.

According to an embodiment, if the first distance 810 measured using the distance sensor is less than the second distance 820 identified using the coordinate information as shown in FIGS. 8A and 8B, the processor 120 may expand the display region 840 by the error region 835. The edge region 845 included in the display region 840 may also be expanded in response to the expansion of the display region 840.

According to an embodiment, if the first distance (e.g., the first distance 850 in FIG. 9A) measured using the distance sensor is greater than the second distance (e.g., the second distance 860 in FIG. 9A) identified using the coordinate information as shown in FIGS. 9A and 9B, the processor 120 may reduce the display region (e.g., the display region 880 in FIG. 9A) by the error region (e.g., the error region 875 in FIG. 9A). The edge region (e.g., the edge region 885 in FIG. 9A) included in the display region 880 may also be reduced in response to the reduction of the display region 880.

Figure 12:
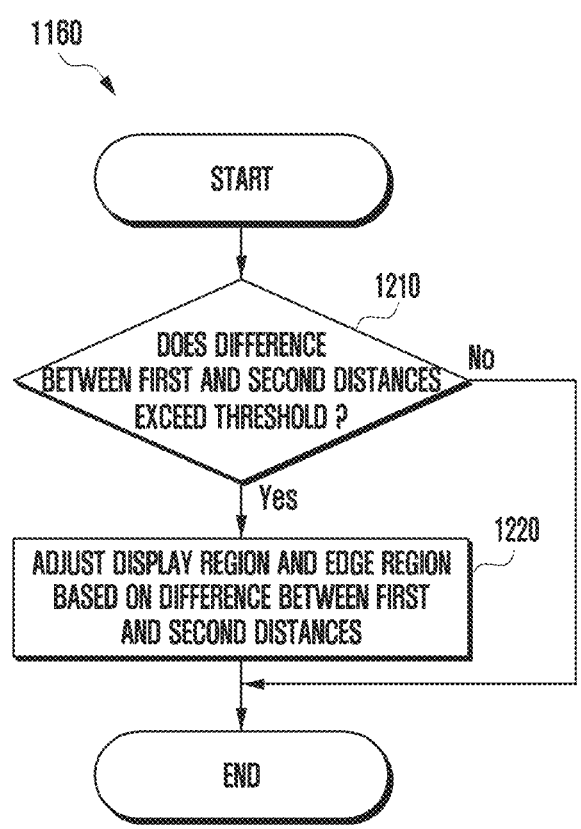
FIG. 12 is a flowchart illustrating an example method of adjusting a display region and an edge region of a flexible display according to various embodiments.

FIG. 12 is a flowchart illustrating an example method of adjusting a display region and an edge region of a flexible display according to various embodiments.

According to an embodiment, operations of FIG. 12 may be included in the operation 1160 of FIG. 11 or associated with the operation 1160.

According to an embodiment, the processor (e.g., the processor 120 in FIG. 1, the processor 760 in FIG. 7) of the electronic device (e.g., the electronic device 200 in FIG. 2A) may identify the first distance (e.g., the first distance 810 in FIG. 8A) measured using the distance sensor and the second distance (e.g., the second distance 820 in FIG. 8A) identified based on the coordinate information of the touch event.

At operation 1210, the processor 120 may determine whether a difference value (e.g., an error (value), the error distance 830 in FIG. 8A) between the first distance 810 and the second distance 820 exceeds a threshold value. For example, the first distance 810 measured using the distance sensor and the second distance 820 measured based on the coordinate information of the touch event may be different from each other, and thus an error may occur. For example, when the difference value exceeds the threshold value, this may refer, for example, to a screen display region (e.g., the display region 840 in FIG. 8A) of the flexible display 230 being different from a physically exposed region of the flexible display 230. Such a difference may include the error region 835 corresponding to the error distance 830.

If it is determined at the operation 1210 that the difference value between the first distance 810 and the second distance 820 exceeds the threshold value (1210—Yes), the processor 120 may adjust the display region 840 and the edge region 845 at operation 1220, based on the difference value between the first distance 810 and the second distance 820. For example, when the difference value exceeds the threshold value, it may refer, for example, to the externally exposed region of the flexible display 230 being significant enough to be visually distinguished.

In another example, when the difference value between the first distance 810 measured using the distance sensor and the second distance 820 measured based on the coordinate information of the touch event is less than the threshold value (1210—No), it may infer that the display region 840 is substantially similar to the externally exposed region of the flexible display 230. This may be a situation in which the electronic device 200 provides a user interface (UI) similar to the size of the physical flexible display 230 to the user.

According to an embodiment, when the difference value exceeds the threshold value, the processor 120 may apply an offset correction value corresponding to the difference value to the display region 840 (e.g., the first display region 840) determined based on the first distance 810. For example, the processor 120 may apply the offset correction value to adjust the size of the user interface displayed through the display region 840 of the flexible display 230. The processor 120 may determine the first display region 840 of the flexible display 230 based on the first distance 810, and display the user interface based on the determined first display region 840. The processor 120 may apply the offset correction value to the user interface displayed on the first display region 840 and adjust the size of the user interface. For example, the processor 120 may adjust the user interface to be expanded, based on the error distance 830 between the first distance 810 and the second distance 820. For example, when the offset correction value is applied, the first display region 840 of the flexible display 230 may be expanded to the second display region 840'. The second display region 840' may be determined based on the second distance 820.

According to an embodiment, the electronic device 200 may display the user interface to match a substantial physical size (e.g., the display region physically exposed to the outside) of the flexible display 230, and improve the usability of the flexible display 230.

Figure 13:
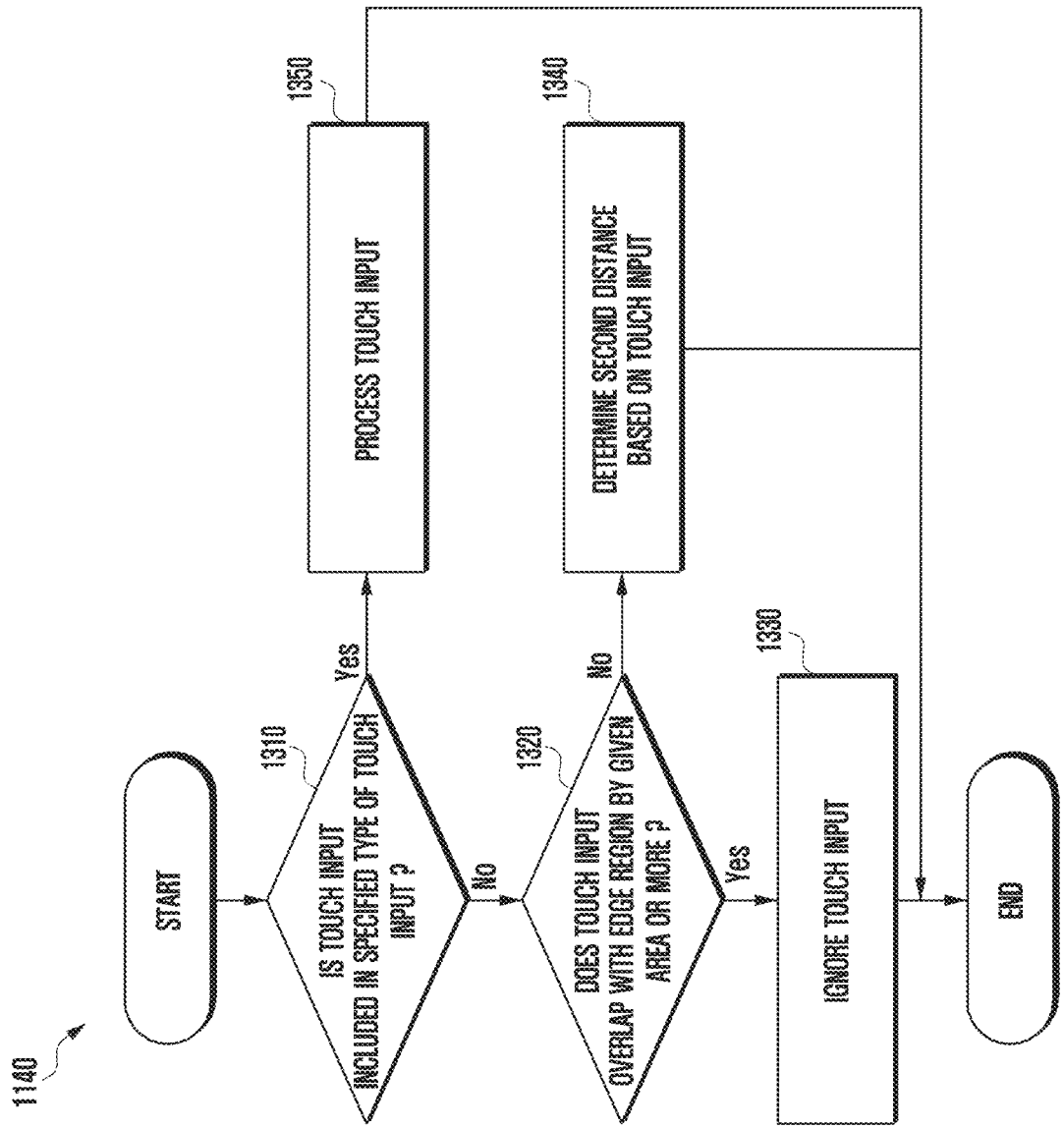
FIG. 13 is a flowchart illustrating an example process of recognizing a touch input in a flexible display according to various embodiments.

FIG. 13 is a flowchart illustrating an example process of recognizing a touch input in a flexible display according to various embodiments.

The operations illustrated in FIG. 13 may be included in the operation 1140 of FIG. 11 or associated with the operation 1140. The operations shown in FIG. 13 may be performed by at least a part of a processor (e.g., the processor 120 in FIG. 1, the processor 760 in FIG. 7) and/or a control circuit (e.g., the control circuit 720 in FIG. 7). Hereinafter, operations described as operations of the electronic device 200 may be understood as operations of at least a part of the processor 760 and/or the control circuit 720.

According to an embodiment, an electronic device (e.g., the electronic device 200 in FIG. 2A) may receive a user's touch input (e.g., a touch event) based on an activated flexible display (e.g., the flexible display 230 in FIG. 2A, the display device 701 in FIG. 7). For example, the processor 120 may identify the type of the touch input through a touch panel (e.g., the touch panel 2303 in FIG. 6) of the display 230.

At operation 1310, the electronic device 200 may determine whether the touch input is included in a specified type of touch input. For example, the electronic device 200 may store coordinate information corresponding to the specified type of touch input (e.g., a palm touch, a normal touch, a one touch, a double touch) in a memory (e.g., the memory 130 in FIG. 1) and compare and/or analyze the touch input with the stored coordinate information at the operation 1310. If it is determined at the operation 1310 that the touch input corresponds to the specified type (1310—Yes), the electronic device 200 may process a predetermined operation based on the touch input at operation 1350.

If it is determined at the operation 1310 that the touch input does not correspond to the specified type (1310—No), the processor 120 may determine at operation 1320 whether the touch input overlaps with an edge region (e.g., the edge region 845 in FIG. 8A) by a given area or more. For example, the electronic device 200 may calculate the area occupied by the touch input in the edge region 845 and store it in the memory 130. The processor 120 may identify the area occupied by the touch input in the edge region 845. If it is determined at the operation 1320 that the touch input overlaps less than the given area (1320—No), the processor 120 may determine a second distance (e.g., the second distance 820 in FIG. 8A) at operation 1340, based on the touch input. For example, the second distance 820 may include an actual physically extended moving distance of a housing (e.g., the second housing 220 in FIG. 2A) of the electronic device 200. According to an embodiment, when the physically extended second distance 820 is identified, the processor 120 may adjust a display region (e.g., the display region 840 in FIG. 8A), based on the identified second distance 820.

If it is determined at the operation 1320 that the touch input of the electronic device 200 overlaps by the given area or more (1320—Yes), the processor 120 may ignore the touch input at operation 1330.

According to an embodiment, the electronic device 200 may identify the type of a user's touch input (e.g., a touch event), and when a predetermined condition is satisfied, determine the second distance 820 (e.g., a moving distance based on coordinate information, an actual physically moved distance) based on coordinate information corresponding to the touch input. Also, based on the second distance 820, the electronic device 200 may adjust the size of the display region 840 (e.g., the size of a user interface).

FIG. 14A is a diagram illustrating an example user interface providing a guide in a slide-in state and a slide-out state according to various embodiments.

According to an embodiment, an electronic device (e.g., the electronic device 200 in FIG. 2A) may include a first housing (e.g., the first housing 210 in FIG. 2A), a second housing (e.g., the second housing 220 in FIG. 2A), and a flexible display 230 disposed to be supported by at least a portion of the first and second housings 210 and 220.

With reference to part (a) of FIG. 14A, the electronic device 200 may be in the slide-in state before the flexible display 230 is expanded. For example, in the slide-in state, the electronic device 200 may display guide information 1401 for determining a first edge line (or region) 1410 of the flexible display 230. The electronic device 200 may obtain a user's touch input (e.g., a touch event) for the first edge line 1410 and determine the position of the first edge line 1410 in the flexible display 230. For example, the first edge line 1410 may represent an outermost display region physically exposed to the outside in response to the flexible display 230 in the slide-in state.

With reference to part (b) of FIG. 14A, the electronic device 200 may be in the slide-out state after the flexible display 230 is expanded. For example, in the slide-out state, the electronic device 200 may display guide information 1402 for determining a second edge line (or region) 1420 of the flexible display 230. The electronic device 200 may obtain a user's touch input (e.g., a touch event) for the second edge line 1420 and determine the position of the second edge line 1420 in the flexible display 230. For example, the second edge line 1420 may represent an outermost display region physically exposed to the outside in response to the flexible display 230 in the slide-out state.

According to an embodiment, the electronic device 200 may display the guide information 1401 and 1402 for determining the first edge line 1410 and the second edge line 1420 in response to a user's request, and determine the first edge line 1410 and the second edge line 1420. For example, the electronic device 200 may store the coordinate information for the determined first and second edge lines 1410 and 1420 in the memory 130, and use the stored coordinate information to identify a physical moving distance of the flexible display 230.

According to an embodiment, the electronic device 200 may measure the first distance (e.g., a sensing distance) using a distance sensor, and identify the second distance (e.g., the first edge line 1410 and the second edge line 1420) based on coordinate information of a user's touch input. The electronic device 200 may identify an error distance between the first distance and the second distance, and when the error distance exceeds a predetermined threshold value, adjust the size of the user interface (UI) based on the second distance (e.g., the first edge line 1410 and the second edge line 1420) corresponding to a physical distance.

Figure 14B:
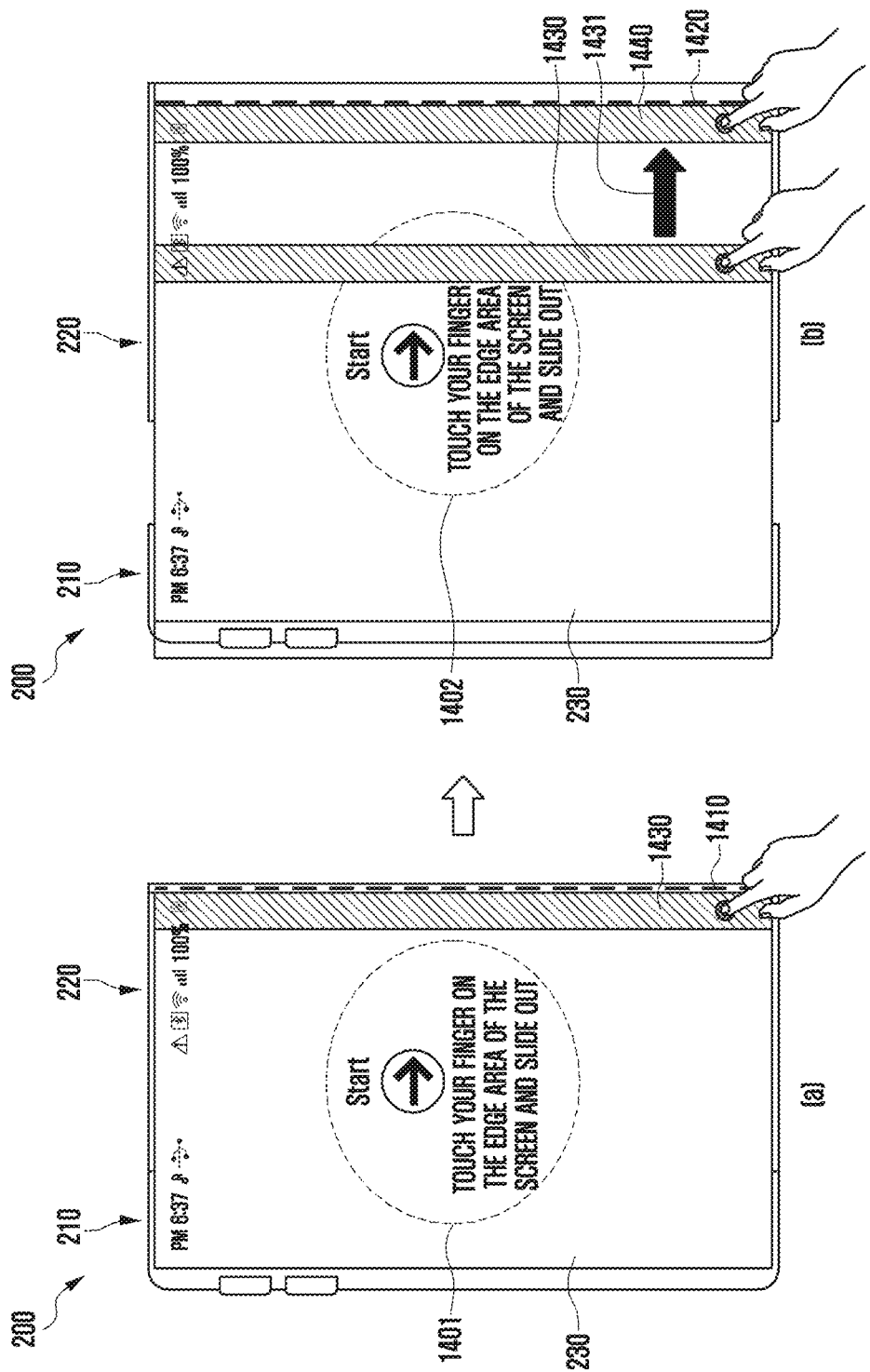
FIG. 14B is a diagram illustrating an example user interface providing a guide for an edge region in a slide-in state and a slide-out state according to various embodiments.

FIG. 14B is a diagram illustrating an example user interface providing a guide for an edge region in a slide-in state and a slide-out state according to various embodiments.

With reference to part (a) of FIG. 14B, the electronic device 200 may be in the slide-in state before the flexible display 230 is expanded. For example, in the slide-in state, the electronic device 200 may display an edge region 1430 corresponding to a range configured based on a first edge line (or region) 1410 of the flexible display 230. The electronic device 200 may display guide information 1401 for the user to perform a touch input (e.g., a touch event) on the edge region 1430. For example, the guide information 1401 may include instructions for maintaining the touch input on the edge region 1430 even while the flexible display 230 is expanded.

With reference to part (b) of FIG. 14B, in the electronic device 200, as the flexible display 230 is expanded, a display position of the edge region 1430 may be changed. For example, the electronic device 200 may change a first edge region 1430 to a second edge area 1440 and display it. Part (b) of FIG. 14B illustrates the slide-out state of the electronic device 200 after the flexible display 230 is expanded. A user's touch input may move from the first edge region 1430 to the second edge region 1440 along a first direction 1431 in which the flexible display 230 is expanded. According to an embodiment, while the flexible display 230 is expanded along the first direction 1431, the electronic device 200 may continuously detect a user's touch input and obtain the coordinate information of the continuously detected touch. For example, the electronic device 200 may drive a motor for expansion and reduction of the flexible display 230, and the size of the flexible display 230 may be changed based on the minimum range (e.g., the first edge line 1410) and the maximum range (e.g., the second edge line 1420) according to motor driving.

According to an embodiment, during a change from the first edge region 1430 to the second edge region 1440, the electronic device 200 may continuously detect a user's touch input and identify a substantial distance physically moved by the flexible display 230. Based on the physically moved distance, the electronic device 200 may adjust the size of a user interface (UI).

Figure 15A:
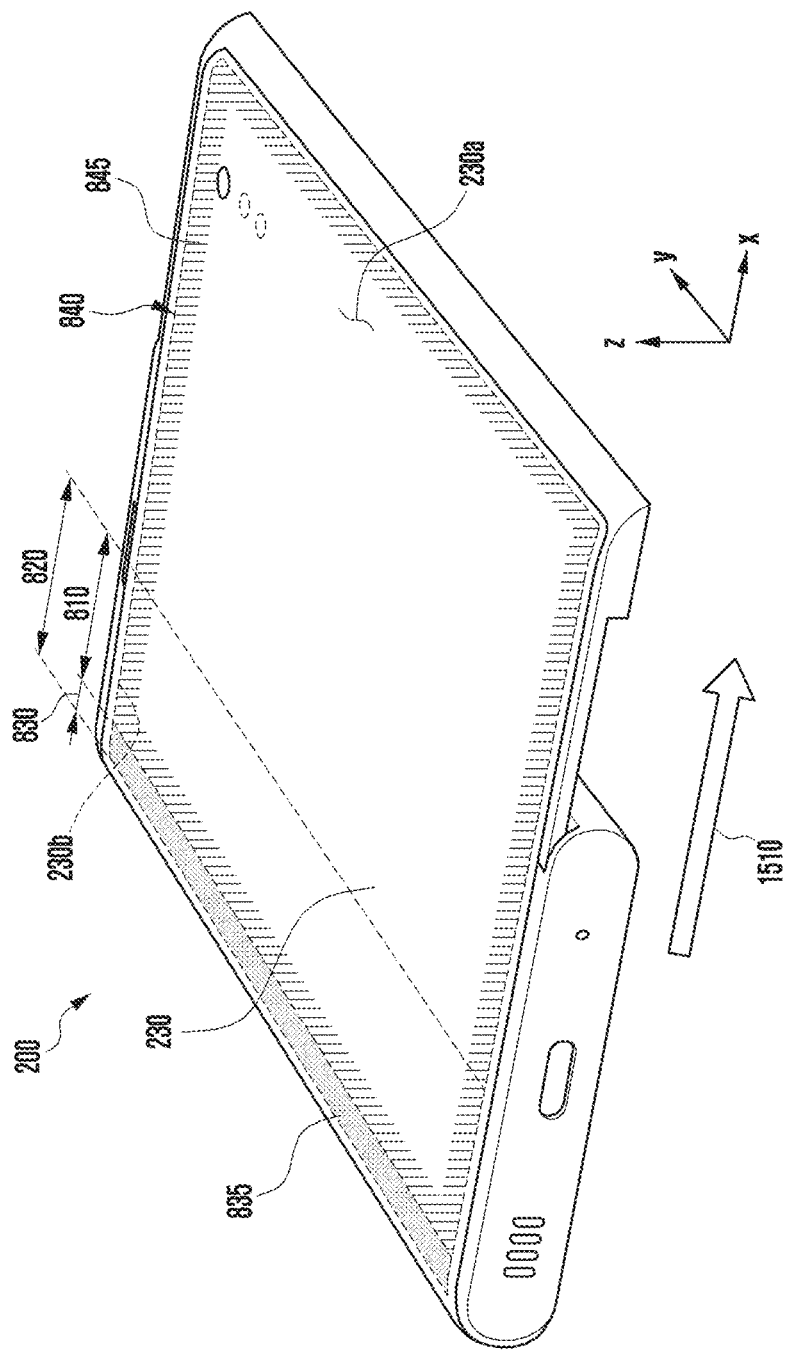
FIG. 15A is a perspective view illustrating an electronic device of a first form factor in which a size of a flexible display is variable according to various embodiments.
Figure 15B:
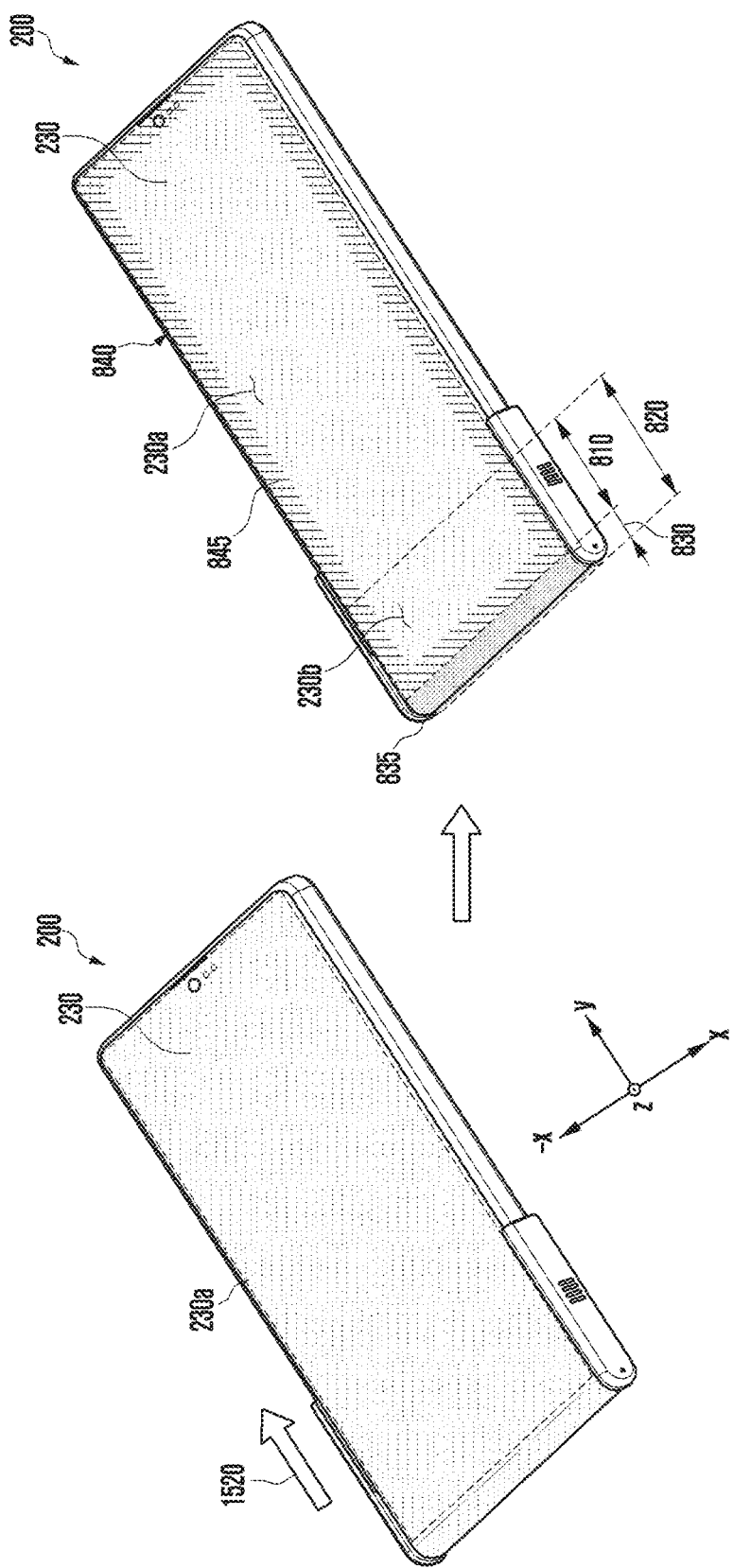
FIG. 15B is a perspective view illustrating an electronic device of a second form factor in which a size of the flexible display is variable according to various embodiments.

FIG. 15A is perspective view illustrating an example electronic device of a first form factor in which a size of a flexible display is variable according to various embodiments. FIG. 15B is perspective view illustrating an example electronic device of a second form factor in which a size of the flexible display is variable according to various embodiments.

FIG. 15A illustrates the first form factor in which the flexible display 230 is expanded based on a direction (e.g., the negative x-axis direction) opposite a direction (e.g., a first direction 1510, the x-axis direction) in which a sliding operation occurs.

FIG. 15B illustrates the second form factor in which the flexible display 230 is expanded when a sliding operation occurs along a second direction 1520 (e.g., the y-axis direction).

With reference to FIG. 15A, the electronic device 200 may be switched from the slide-in state to the slide-out state by the sliding operation in the first direction 1510, and the display region 840 of the flexible display 230 may be at least partially expanded. For example, when the electronic device 200 is in the slide-in state, a first portion 230a of the flexible display 230 may be exposed to the outside. When the electronic device 200 is in the slide-out state, a second portion 230b corresponding to the extension of an exposed region of the flexible display 230 may be exposed to the outside together with the first portion 230a of the flexible display 230. In the slide-out state, the electronic device 200 may display a user interface.

According to an embodiment, in response to the sliding operation, the electronic device 200 may measure the first distance 810 using the distance sensor. According to an embodiment, when the sliding operation occurs, a distance (e.g., the second distance 820) physically moved by the flexible display 230 may be different from a moving distance (e.g., the first distance 810) measured using the distance sensor. With reference to FIG. 15A, a difference may occur between the first distance 810 and the second distance 820 by the error distance 830. According to an embodiment, the electronic device 200 may determine the error region 835 based on the error distance 830.

According to an embodiment, the electronic device 200 may identify a touch event based on the flexible display 230 and, based on the coordinate information of the touch event, measure the second distance 820 physically moved by the flexible display 230. According to an embodiment, the electronic device 200 may identify the occurrence of the error distance 830 between the first distance 810 measured using the distance sensor and the second distance 820 measured based on coordinate information, and expand the display region 840 by the error distance 830. For example, the user interface displayed on the display region 840 may be expanded by the error distance 830.

With reference to FIG. 15B, the electronic device 200 may be switched from the slide-in state to the slide-out state by the sliding operation in the second direction 1520 (e.g., the y-axis direction), and the display region of the flexible display 230 may be expanded. FIG. 15B differs from FIG. 15A only in the form (e.g., form factor) of the electronic device 200, but the operation is substantially the same. Therefore, the description of the operation of FIG. 15B may be replaced with the description of FIG. 15A.

The electronic device of FIG. 15A has the first form factor in which the exposed region of the flexible display 230 is expanded along the first direction (e.g., the x-axis direction), and the electronic device of FIG. 15B has the second form factor in which the exposed region of the flexible display 230 is expanded along the second direction (e.g., the y-axis direction). According to various embodiments, the electronic device is not limited to a specific form factor. The electronic device may include a form in which the exposed region of the flexible display 230 is at least partially expanded.

Besides, the electronic device may have various form factors. Although not shown, in a certain electronic device, the flexible display 230 may be expanded in a plurality of directions. For example, in a certain electronic device, the exposed region of the flexible display 230 may be extended in the positive and negative x-axis directions or the positive and negative y-axis directions.

Figure 16:
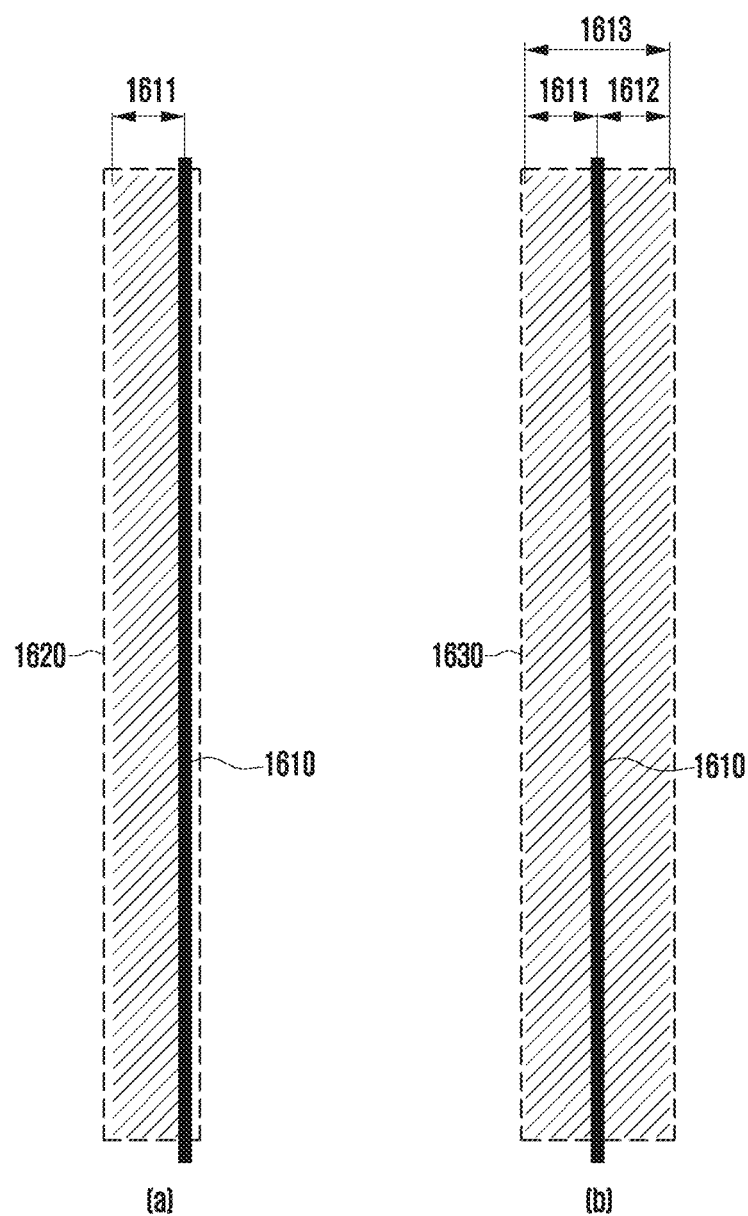
FIG. 16 is a diagram illustrating an example in which an edge region is variable according to various embodiments.

FIG. 16 is a diagram illustrating an example in which an edge region is variable according to various embodiments.

According to an embodiment, in an electronic device (e.g., the electronic device 200 in FIG. 2A), a flexible display (e.g., the flexible display 230 in FIG. 2A, the display device 701 in FIG. 7) may be expanded or reduced, and an edge region may be configured based on an edge line (e.g., a reference line 1610) of the flexible display 230.

With reference to part (a) of FIG. 16, a processor (e.g., the processor 120 in FIG. 1, the processor 760 in FIG. 7) of the electronic device 200 may identify the reference line 1610 and define a range occupied by a predetermined distance (e.g., a first width 1611, about 3 pixels to about 10 pixels) from the reference line 1610 as an edge region 1620. For example, the processor 120 may determine the first width 1611 in response to a situation of expanding or reducing the flexible display 230, and the edge area 1620 may be variable depending on the determined first width 1611. In another example, after the flexible display 230 is expanded or reduced, the processor 120 may count touch inputs (e.g., touch events) for a given time, based on the reference line 1610, and determine the first width 1611 based on the number of counted touch inputs.

According to an embodiment, the first width 1611 may be determined based on a sliding speed of the electronic device 200 (e.g., a speed at which the flexible display 230 is expanded or reduced), the number of touch inputs, and/or the type of a touch input. For example, if the sliding speed is fast, the accuracy of the distance measured using a sensor (e.g., the sensor 710 in FIG. 7) may decrease, so the processor 120 may determine the first width 1611 to be wide. In another example, if the number of counted touch inputs exceeds a given threshold, the processor 120 may determine the first width 1611 to be wide. In still another example, if a touch input (e.g., a palm touch) exceeds a given area, the processor 120 may determine the first width 1611 to be wide.

According to an embodiment, when the position of the reference line 1610 is changed, the processor 120 may determine the first width 1611 to be wider. When the position of the reference line 1610 is changed, the processor 120 may maintain the edge region 1620 based on the first width 1611 for a given time, and restore the first width 1611 to its original state when the given time elapses.

With reference to part (b) of FIG. 16, the processor 120 of the electronic device 200 may identify the reference line 1610 and define a range occupied by a predetermined distance to both sides (e.g., left and right) from the reference line 1610 as an edge region 1630. For example, the processor 120 may define, as the edge region 1630, a range corresponding to a left distance (e.g., a first width 1611) and a right distance (e.g., a second width 1612) from the reference line 1610. For example, the area of the edge region 1630 may be determined based on a third width 1613.

According to an embodiment, when the flexible display 230 is expanded based on the reference line 1610 (e.g., an edge line), the edge region corresponding to the first width 1611 may be exposed to the outside and included in the display region. On the other hand, the edge region corresponding to the second width 1612 may be at least partially slid in into the electronic device 200 and may not be included in the display region.

According to an embodiment, the reference line 1610 may include a line corresponding to an end point of a moving distance measured by the electronic device 200 using the sensor 710. According to an embodiment, the reference line 1610 may include an edge line of the display region that is variable in the electronic device 200.

Figure 17A:
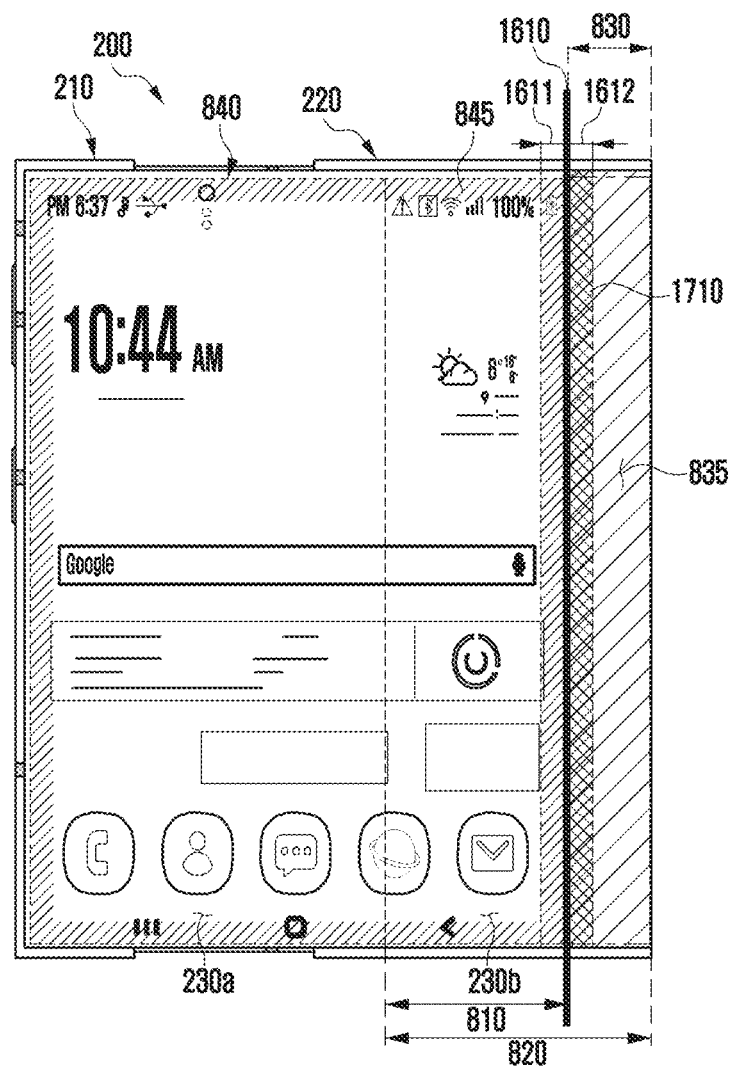
FIG. 17A is a diagram illustrating a first example of configuring an edge region in a first situation in which a size of a flexible display is variable according to various embodiments.

FIG. 17A is a diagram illustrating a first example of configuring an edge region in a first situation (e.g., the first situation in FIG. 8A) in which a size of a flexible display is variable according to various embodiments.

FIG. 17A illustrates that when the state of an electronic device (e.g., the electronic device 200 in FIG. 2) is changed (e.g., when at least a portion of the flexible display 230 slides in from the slide-out state to the intermediate state or slides out from the slide-in state to the intermediate state), an error distance 830 may occur between a first distance 810 that is a moving distance of a housing (e.g., the second housing 220 in FIG. 2A) measured by a sensor and a second distance 820 that is an actual moving distance of the housing. In this case, although an error region 835 is recognized as a slide-in region by a processor (e.g., the processor 120 in FIG. 1, the processor 760 in FIG. 7), in reality the housing 220 is exposed to the outside.

According to an embodiment, the processor 120 may define an edge region 845 based on a reference line 1610 (e.g., an edge line of a display region 840, a line corresponding to an end point of the first distance 810). The processor 120 may define a range occupied by a predetermined distance to both sides (e.g., left and right) from the reference line 1610 as the edge region. For example, the processor 120 may define, as the edge region, a first range corresponding to a left distance (e.g., a first width 1611) and a second range 1710 corresponding to a right distance (e.g., a second width 1612) from the reference line 1610. According to an embodiment, the first width 1611 and the second width 1612 may be determined to be different from each other. According to an embodiment, the processor 120 may determine the second width 1612 in response to the error distance 830 and define the error region 835 as the second region 1710.

Figure 17B:
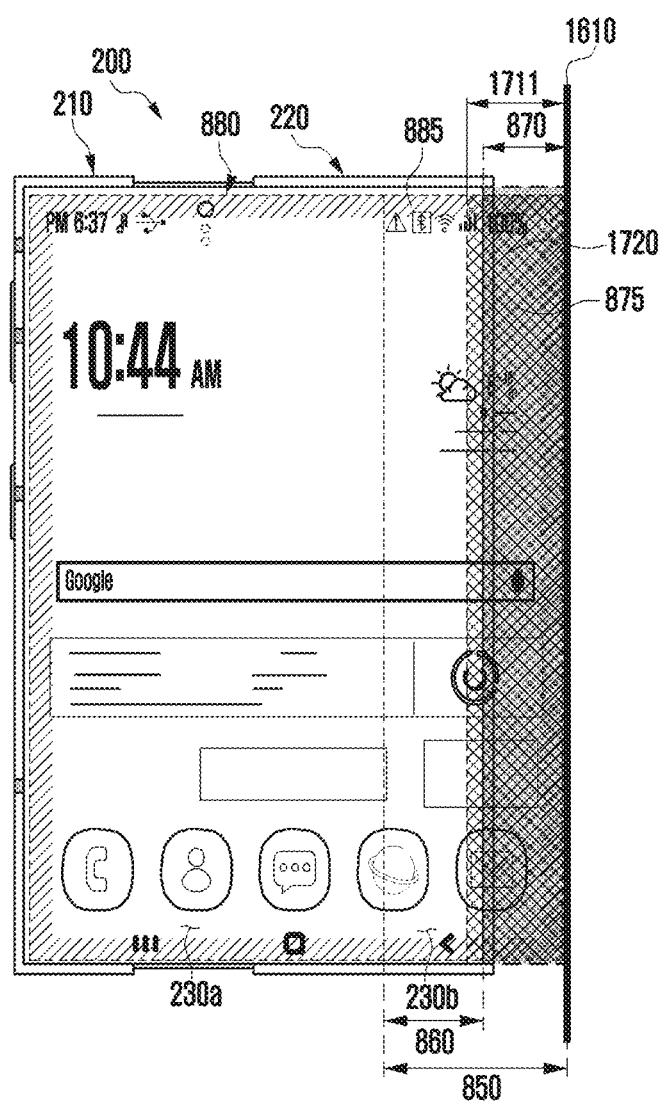
FIG. 17B is a diagram illustrating a second example of configuring an edge region in a second situation in which a size of a flexible display is variable according to various embodiments.

FIG. 17B is a diagram illustrating a second example of configuring an edge region in a second situation in which a size of a flexible display is variable according to various embodiments.

FIG. 17B illustrates that when the state of an electronic device (e.g., the electronic device 200 in FIG. 2) is changed (e.g., when at least a portion of the flexible display 230 slides in from the slide-out state to the intermediate state or slides out from the slide-in state to the intermediate state), an error distance 870 may occur between a first distance 850 that is a moving distance of a housing (e.g., the second housing 220 in FIG. 2A) measured by a sensor and a second distance 860 that is an actual moving distance of the housing. In this case, although an error region 875 is recognized as an exposed region by a processor (e.g., the processor 120 in FIG. 1, the processor 760 in FIG. 7), in reality it is in a slide-in state inside the electronic device 200.

According to an embodiment, the processor 120 may define an edge region 845 based on a reference line 1610 (e.g., an edge line of a display region 880, a line corresponding to an end point of the first distance 850). The processor 120 may define a range occupied by a predetermined distance to both sides (e.g., left and right) from the reference line 1610 as the edge region. For example, the processor 120 may define, as the edge region, a first range 1720 corresponding to a left distance (e.g., a first width 1711) from the reference line 1610. According to an embodiment, the error region 875 may be substantially slid in the inside of the electronic device 200 and may not be exposed to the outside. The processor 120 may detect a touch input (e.g., a touch event) based on a portion of the display region 880 exposed to the outside and, based on the detected touch input, consider the first region 1720 corresponding to the first width 1711 as the edge region. The processor 120 may identify the display region (e.g., the adjusted display region 880' in FIG. 9A) corresponding to the second distance 860 and change the range of the edge region.

According to various example embodiments, a method may include: identifying a first distance for a flexible display (e.g., the flexible display 230 in FIG. 2A) through a sensor (e.g., a distance sensor, the sensor module 176 in FIG. 1) in response to a change from a slide-in state to a slide-out state, detecting a touch event for at least a partial region of the flexible display, identifying a second distance for the flexible display based on coordinate information corresponding to the detected touch event, adjusting a size of a user interface based on a difference value between the first distance and the second distance, and displaying the adjusted user interface through the flexible display.

According to an example embodiment, the method may further include: determining a first user interface based on the first distance, and adjusting a size of the first user interface by applying a correction value based on the difference value between the first distance and the second distance.

According to an example embodiment, the method may further include: determining whether the difference value between the first distance and the second distance exceeds a threshold value, and adjusting the size of the user interface based on the difference value exceeding the threshold value.

According to an example embodiment, detecting the touch event may include: detecting the touch event through a touchscreen panel being in an activated state and included in the flexible display.

According to an example embodiment, detecting the touch event may include: identifying an edge line of the flexible display in response to the change from the slide-in state to the slide-out state, configuring, as an edge region, a region occupied by a specified length from the identified edge line, and detecting occurrence of the touch event based on the configured edge region.

According to an example embodiment, the method may further include: displaying first guide information for identifying a first edge line of the flexible display in the slide-in state and determining the first edge line in response to an input for the first edge line, and displaying second guide information for identifying a second edge line of the flexible display in the slide-out state and determining the second edge line in response to an input for the second edge line.

According to an example embodiment, the method may further include: determining a first user interface based on the first edge line in the slide-in state, and determining a second user interface based on the second edge line in the slide-out state. The user interface may be adjusted from the first user interface to the second user interface in response to the change from the slide-in state to the slide-out state.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a flexible display having a first portion visible from an outside and a second portion extending from the first portion and accommodated in an inner space of the housing in a slide-in state, wherein a visible area of the flexible display from the outside is expanded in response to a change from the slide-in state to a slide-out state according to a sliding of the housing;
a sensor configured to detect a sliding of the flexible display;
a memory; and
a processor operatively connected to the flexible display, the sensor, and the memory,
wherein the processor is configured to:
identify a first distance for the sliding of the flexible display through the sensor in response to the change from the slide-in state to the slide-out state, and control the flexible display to display a user interface based on the first distance,
identify touch information from a touch on at least a partial region of the flexible display, wherein at least the partial region is determined based on the first distance,
adjust at least one of a size or position of the user interface based on the first distance and the touch information, and
control the flexible display to display the adjusted user interface through the flexible display.

2. The electronic device of claim 1, wherein at least the partial region includes a first region and a second region based on a line corresponding to an end point of the first distance.

3. The electronic device of claim 2, wherein the processor is further configured to:
identify a second distance for the sliding of the flexible display based on coordinate information corresponding to the detected touch on the first region, and
adjust at least one of the size or position of the user interface based on a difference value between the first distance and the second distance.

4. The electronic device of claim 2, wherein the processor is further configured to:
identify an error distance for the sliding of the flexible display based on a type of touch pattern corresponding to the detected touch on the second region, and
adjust at least one of the size or position of the user interface based on a difference value between the first distance and the error distance.

5. The electronic device of claim 4, wherein the processor is further configured to:
identify whether the difference value exceeds a set threshold value, and
adjust, in response to the difference value exceeding the set threshold value, at least one of the size or position of the user interface based on the difference value.

6. The electronic device of claim 1, wherein the flexible display includes a touchscreen panel configured to maintain an activated state, and
wherein the processor is further configured to detect the touch through the touchscreen panel.

7. The electronic device of claim 3, wherein the processor is further configured to:
construct a table by matching the first distance and the coordinate information, and
identify the second distance for the flexible display based on the constructed table.

8. The electronic device of claim 1, wherein the sensor includes a magnetic force sensor, and
wherein the processor is further configured to:
detect a change in magnetic force using the magnetic force sensor in response to the change from the slide-in state to the slide-out state, and
identify the first distance for the flexible display based on the change in the magnetic force.

9. The electronic device of claim 2, wherein the processor is further configured to:

identify an edge line corresponding to the first distance in response to the change from the slide-in state to the slide-out state, configure the first region and the second region occupied by a specified length from the identified edge line, and identify the touch information based on at least one of the configured first region and the second region.

10. The electronic device of claim 1, wherein the housing includes a first housing having a first space, a second housing combined to be slidable from the first housing along a first direction and having a second space, and a bendable support connected to the first housing, accommodated at least partially in the second space in the slide-in state, and being at least partially coplanar with the first housing in the slide-out state, and wherein the flexible display is configured to be expanded based on the second housing sliding along the first direction.

11. The electronic device of claim 3, wherein the processor is further configured to:

identify whether the difference value exceeds a set threshold value, and adjust, in response to the difference value exceeding the set threshold value, at least one of the size or position of the user interface based on the difference value.

12. The electronic device of claim 1, wherein the processor is further configured to:

control the flexible display to display first guide information for identifying a first edge line of the flexible display in the slide-in state and determine the first edge line in response to an input corresponding to the first guide information, and control the flexible display to display second guide information for identifying a second edge line of the flexible display in the slide-out state and determine the second edge line in response to an input corresponding to the second guide information.

13. The electronic device of claim 12, wherein the processor is further configured to:

determine a first user interface based on the first edge line in the slide-in state, determine a second user interface based on the second edge line in the slide-out state, and adjust the first user interface to the second user interface in response to the change from the slide-in state to the slide-out state.

14. The electronic device of claim 1, wherein the processor is further configured to:

identify a contact area of the touch based on coordinate information corresponding to the touch, and control the flexible display to display the user interface through the flexible display in response to the contact area being greater than a set threshold area.

15. A method comprising:

identifying a first distance for sliding of a flexible display through a sensor in response to a change from a slide-in state to a slide-out state;

displaying a user interface based on the first distance through the flexible display, identifying touch information from a touch on at least a partial region of the flexible display, wherein at least the partial region is determined based on the first distance;

adjusting at least one of a size or position of the user interface based on the first distance and the touch information; and displaying the adjusted user interface through the flexible display.

16. The method of claim 15, wherein at least the partial region includes a first region and a second region based on a line corresponding to an end point of the first distance.

17. The method of claim 16, further comprising:

identifying a second distance for the sliding of the flexible display based on coordinate information corresponding to the detected touch on at least the partial region, and adjusting at least one of the size or position of the user interface based on a difference value between the first distance and the second distance.

18. The method of claim 16, further comprising:

identifying an error distance for the sliding of the flexible display based on a type of touch pattern corresponding to the detected touch on at least the partial region; and adjusting the size or position of the user interface based on a difference value between the first distance and the error distance.

19. The method of claim 15, wherein detecting the touch event includes:

identifying an edge line corresponding to the first distance in response to the change from the slide-in state to the slide-out state;

configuring the first region and the second region occupied by a specified length from the identified edge line; and identifying the touch information based on at least one of the configured first region and the second region.

20. The method of claim 15, further comprising:

displaying first guide information for identifying a first edge line of the flexible display in the slide-in state and determining the first edge line in response to an input corresponding to the first guide information; and displaying second guide information for identifying a second edge line of the flexible display in the slide-out state and determining the second edge line in response to an input corresponding to the second guide information.

21. The method of claim 20, further comprising:

determining a first user interface based on the first edge line in the slide-in state; and determining a second user interface based on the second edge line in the slide-out state, wherein the user interface is adjusted from the first user interface to the second user interface in response to the change from the slide-in state to the slide-out state.

* * * * *